United States Patent
Liu et al.

(10) Patent No.: US 10,820,299 B2
(45) Date of Patent: Oct. 27, 2020

(54) RADIO RESOURCE MANAGEMENT CONFIGURATION FOR USER EQUIPMENT WITH WAKE-UP SIGNAL RECEIVERS

(71) Applicant: QUALCOMM Incorporated, San Diego, CA (US)

(72) Inventors: Le Liu, Fremont, CA (US); Alberto Rico Alvarino, San Diego, CA (US); Mungal Singh Dhanda, Slough (GB); Umesh Phuyal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/182,380

(22) Filed: Nov. 6, 2018

(65) Prior Publication Data

US 2019/0150094 A1    May 16, 2019

Related U.S. Application Data

(60) Provisional application No. 62/585,478, filed on Nov. 13, 2017.

(51) Int. Cl.
*G08C 17/00* (2006.01)
*H04W 68/02* (2009.01)
(Continued)

(52) U.S. Cl.
CPC ........... *H04W 68/02* (2013.01); *H04W 24/08* (2013.01); *H04W 24/10* (2013.01); *H04W 48/16* (2013.01);
(Continued)

(58) Field of Classification Search
CPC ..... H04W 68/02; H04W 76/27; H04W 24/08; H04W 24/10; H04W 48/16;
(Continued)

(56) References Cited

U.S. PATENT DOCUMENTS 1,005,160 A1    8/2018    Ang et al.
2010/0227617 A1    9/2010    Jung et al.
(Continued)

OTHER PUBLICATIONS

Radio Resource Control. Feb. 2016. https://www.sciencedirect.com/topics/computer-science/radio-resource-control (Year: 2016).*
(Continued)

*Primary Examiner* — Thai D Hoang
(74) *Attorney, Agent, or Firm* — Holland & Hart LLP/Qualcomm Inc.; Nerrie M. Zohn

(57) ABSTRACT

Methods, systems, and devices for wireless communications are described. A wireless device, such as a user equipment (UE), may receive a configuration of a wake-up signal periodicity and perform discontinuous monitoring for a plurality of wake-up signals based at least in part on the wake-up signal periodicity. In some cases, the UE may perform a radio resource management (RRM) measurement according to an RRM measurement periodicity that corresponds to the wake-up signal periodicity. In such cases, the UE may monitor for paging messages to receive paging information, or updates to system information, during one or more wake-up signal occasions that correspond to the RRM measurement periodicity. For instance, paging information may be received while the UE is performing RRM measurements, where paging message may be monitored for based on the wake-up signal periodicity.

26 Claims, 22 Drawing Sheets

(51) Int. Cl.
  *H04W 52/02* (2009.01)
  *H04W 48/16* (2009.01)
  *H04W 76/27* (2018.01)
  *H04W 24/08* (2009.01)
  *H04W 72/04* (2009.01)
  *H04W 24/10* (2009.01)
  *H04W 76/28* (2018.01)

(52) U.S. Cl.
  CPC ..... *H04W 52/028* (2013.01); *H04W 52/0216* (2013.01); *H04W 52/0229* (2013.01); *H04W 52/0248* (2013.01); *H04W 68/025* (2013.01); *H04W 72/0446* (2013.01); *H04W 76/27* (2018.02); *H04W 76/28* (2018.02)

(58) Field of Classification Search
  CPC ......... H04W 52/0216; H04W 52/0229; H04W 52/0248; H04W 52/028; H04W 68/025; H04W 72/0446
  USPC ................................. 370/311; 340/7.32–7.42
  See application file for complete search history.

(56) References Cited

U.S. PATENT DOCUMENTS

| | | | |
|---|---|---|---|
| 2017/0127439 A1 | 5/2017 | Gopal et al. | |
| 2017/0290086 A1 | 10/2017 | Patel et al. | |
| 2019/0150114 A1 | 5/2019 | Liu et al. | |
| 2019/0174449 A1* | 6/2019 | Shan | H04W 60/04 |
| 2019/0174466 A1* | 6/2019 | Zhang | H04L 5/0048 |
| 2020/0053670 A1* | 2/2020 | Jung | H04W 56/0015 |

OTHER PUBLICATIONS

"3 Generation Partnership Project, Technical Specification Group Radio Access Network, Evolved Universal Terrestrial Radio Access (E-UTRA), User Equipment (UE) Procedures in Idle Mode (Release 14)", 3GPP Standard, Technical Specification, 3GPP TS 36.304, 3rd Generation Partnership Project (3GPP), Mobile Competence Centre, 650, Route Des Lucioles, F-06921 Sophia-Antipolis Cedex, France, vol. RAN WG2, No. V14.4.0, Sep. 25, 2017 (Sep. 25, 2017), XP051337305, pp. 1-49.

"3rd Generation Partnership Project, Technical Specification Group Radio Access Network, Evolved Universal Terrestrial Radio Access (E-UTRA), Radio Resource Control (RRC), Protocol Specification (Release 13)", 3GPP Standard, Technical Specification, 3GPP Ts 36.331, 3rd Generation Partnership Project (3GPP), Mobile Competence Centre, 650, Route Des Lucioles, F-06921 Sophia-Antipolis Cedex, France, vol. RAN WG2, No. V13.7.1, Sep. 29, 2017 (Sep. 29, 2017), XP051337498, pp. 1-642.

Ericsson: "Wake-Up Signal for NB-IoT & eMTC", 3GPP Draft, R2-1710749 Wake-Up Signal for NB-IoT and eMTC, 3rd Generation Partnership Project (3GPP), Mobile Competence Centre, 650, Route Des Lucioles, F-06921 Sophia-Antipolis Cedex, France, vol. RAN WG2, No. Prague, Czech Republic, Oct. 9, 2017-Oct. 13, 2017, Oct. 8, 2017 (Oct. 8, 2017), XP051342775, 8 Pages, Retrieved from the Internet: URL:http://www.3gpp.org/ftp/Meetings_3GPP_SYNC/RAN2/Docs/ [retrieved on Oct. 8, 2017].

Huawei et al., "On Configurations and Procedures of Power Saving Signal", 3GPP Draft, R1-1716985, 3rd Generation Partnership Project (3GPP) Mobile Competence Centre, 650, Route Des Lucioles, F-06921 Sophia-Antipolis Cedex, France, vol. RAN WG1, No. Prague, Czech Republic, Oct. 9, 2017-Oct. 8, 2017 (Oct. 8, 2017), XP051340177, 5 Pages, Retrieved from the Internet: URL:http://www.3gpp.org/ftp/Meetings_3GPP_SYNC/RAN1/Docs/ [retrieved on Oct. 8, 2017].

Intel Corporation: "\WUS Consideration for efeMTC", 3GPP Draft, R2-1710641 WUS, 3rd Generation Partnership Project (3GPP), Mobile Competence Centre, 650, Route Des Lucioles, F-06921 Sophia-Antipolis Cedex, France, vol. RAN WG2, No. Prague, Czech Republic, Oct. 9, 2017-Oct. 13, 2017 (Oct. 8, 2017), XP051342675, 7 Pages, Retrieved from the Internet: URL:http://www.3gpp.org/ftp/Meetings_3GPP_SYNC/RAN2/Docs/ [retrieved on Oct. 8, 2017].

International Search Report and Written Opinion—PCT/US2018/059662—ISA/EPO—Feb. 11, 2019. (180747U2WO).

* cited by examiner

RADIO RESOURCE MANAGEMENT CONFIGURATION FOR USER EQUIPMENT WITH WAKE-UP SIGNAL RECEIVERS

CROSS REFERENCES

The present Application for Patent claims benefit of U.S. Provisional Patent Application No. 62/585,478 by Liu et al., entitled "FALLBACK MODE FOR WAKE-UP SIGNAL RECEIVERS," filed Nov. 13, 2017, assigned to the assignee hereof, and expressly incorporated by reference in its entirety.

BACKGROUND

The following relates generally to wireless communication, and more specifically to radio resource management (RRM) configurations for user equipment (UEs) with wake-up signal (WUS) receivers.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as UEs.

In some wireless communications system, a base station may signal to a UE that data and/or system information is available by sending paging messages during paging occasions (POs). A UE may monitor a paging occasion, for example, in a particular subframe, to receive a paging message and determine that paging information and/or system information is available for the UE. In some cases, the base station and UE may utilize a power saving signal, such as a WUS, for idle mode paging. For example, the UE may wake from a sleep state upon receiving the WUS and monitor for downlink transmissions (such as a paging message) from the base station. However, network errors or interference within the system may lead to missed WUS reception by the UE, which may result in failed detection of paging messages that indicate important system information changes, thereby hampering UE performance.

SUMMARY

The described techniques relate to improved methods, systems, devices, or apparatuses that support a configuration of a radio resource management (RRM) for user equipment (UEs) with wake-up signal (WUS) receivers. In some cases, a base station may signal a change in system information to a UE via a page or paging message. The paging message may carry an indication of a change in system information and also indicate that paging information is available for one or more UEs associated with the base station. A UE may periodically monitor for paging messages transmitted from the base station during paging occasions (POs). A PO may be a transmission time interval (TTI) (such as a subframe) where a downlink channel, such as a physical downlink control channel (PDCCH) or physical downlink shared channel (PDSCH), carries the paging message. Additionally, a base station may use a WUS during idle-mode paging to indicate if the UE is to decode a particular downlink channel. In some cases, the UE may refrain from monitoring POs until a WUS has been detected prior to a PO. While the utilization of the WUS may serve to optimize power consumption at the UE, in some cases, the UE may miss the WUS, and therefore also miss a subsequent paging message including important information pertaining to changes in system information.

Accordingly, a base station may configure a fallback mode for the UE to detect WUSs to avoid missed detection of paging messages. For example, a network may configure a UE to monitor POs regardless of an absence of a WUS to ensure notifications pertaining to changes in system information are not missed. Such techniques may be referred to as paging monitor periodicity without WUS (or page monitoring periodicity without WUS) and may enable the UE to monitor for paging information according to a periodicity configured by the network. For example, the base station or network may configure the UE to monitor paging information according to a periodicity related to the PO periodicity, the WUS periodicity, an RRM measurement periodicity, or a modification period related to system information modification.

A method of wireless communication at a UE is described. The method may include receiving a configuration of a wake-up signal periodicity, performing discontinuous monitoring for a set of wake-up signals based on the wake-up signal periodicity, and performing a RRM measurement according to an RRM measurement periodicity, where the RRM measurement periodicity corresponds to one or more wake-up signal occasions according to the wake-up signal periodicity.

An apparatus for wireless communication is described. The apparatus may include a processor, memory in electronic communication with the processor, and instructions stored in the memory. The instructions may be executable by the processor to cause the apparatus to receive a configuration of a wake-up signal periodicity, perform discontinuous monitoring for a set of wake-up signals based on the wake-up signal periodicity, and perform a RRM measurement according to an RRM measurement periodicity, where the RRM measurement periodicity corresponds to one or more wake-up signal occasions according to the wake-up signal periodicity.

Another apparatus for wireless communication is described. The apparatus may include means for receiving a configuration of a wake-up signal periodicity, performing discontinuous monitoring for a set of wake-up signals based on the wake-up signal periodicity, and performing a RRM measurement according to an RRM measurement periodicity, where the RRM measurement periodicity corresponds to one or more wake-up signal occasions according to the wake-up signal periodicity.

A non-transitory computer-readable medium storing code for wireless communication is described. The code may include instructions executable by a processor to receive a configuration of a wake-up signal periodicity, perform discontinuous monitoring for a set of wake-up signals based on the wake-up signal periodicity, and perform a RRM measurement according to an RRM measurement periodicity, where the RRM measurement periodicity corresponds to one or more wake-up signal occasions according to the wake-up signal periodicity.

Some examples of the method, apparatuses, and non-transitory computer-readable medium described herein may further include operations, features, means, or instructions for determining, based on the RRM measurement, a reference signal received power (RSRP), or a reference signal received quality (RSRQ), or a confirmation of a serving cell, or a combination thereof. In some examples of the method, apparatuses, and non-transitory computer-readable medium described herein, the wake-up signal periodicity corresponds to one or more DRX cycles.

Some examples of the method, apparatuses, and non-transitory computer-readable medium described herein may further include operations, features, means, or instructions for determining whether a wake-up signal may be detected at the one or more wake-up signal occasions, and performing the RRM measurement based on a determination that at least one wake-up signal may be detected at the one or more wake-up signal occasions.

Some examples of the method, apparatuses, and non-transitory computer-readable medium described herein may further include operations, features, means, or instructions for determining whether a wake-up signal may be detected at the one or more wake-up signal occasions, and performing the RRM measurement at a temporally last wake-up signal occasion based on a determination that no wake-up signals were detected at the one or more wake-up signal occasions.

Some examples of the method, apparatuses, and non-transitory computer-readable medium described herein may further include operations, features, means, or instructions for detecting a paging message according to a page monitoring periodicity that corresponds to the RRM measurement periodicity, and identifying a system information change notification based on the detected paging message.

A method of wireless communication is described. The method may include determining a wake-up signal periodicity for a set of wake-up signals, configuring, based on the wake-up signal periodicity, a RRM measurement periodicity for a UE to perform an RRM measurement, where the RRM measurement periodicity corresponds to one or more wake-up signal occasions according to the wake-up signal periodicity, and transmitting a configuration indicating the RRM measurement periodicity to the UE.

An apparatus for wireless communication is described. The apparatus may include a processor, memory in electronic communication with the processor, and instructions stored in the memory. The instructions may be executable by the processor to cause the apparatus to determine a wake-up signal periodicity for a set of wake-up signals, configure, based on the wake-up signal periodicity, a RRM measurement periodicity for a UE to perform an RRM measurement, where the RRM measurement periodicity corresponds to one or more wake-up signal occasions according to the wake-up signal periodicity, and transmit a configuration indicating the RRM measurement periodicity to the UE.

Another apparatus for wireless communication is described. The apparatus may include means for determining a wake-up signal periodicity for a set of wake-up signals, configuring, based on the wake-up signal periodicity, a RRM measurement periodicity for a UE to perform an RRM measurement, where the RRM measurement periodicity corresponds to one or more wake-up signal occasions according to the wake-up signal periodicity, and transmitting a configuration indicating the RRM measurement periodicity to the UE.

A non-transitory computer-readable medium storing code for wireless communication is described. The code may include instructions executable by a processor to determine a wake-up signal periodicity for a set of wake-up signals, configure, based on the wake-up signal periodicity, a RRM measurement periodicity for a UE to perform an RRM measurement, where the RRM measurement periodicity corresponds to one or more wake-up signal occasions according to the wake-up signal periodicity, and transmit a configuration indicating the RRM measurement periodicity to the UE.

Some examples of the method, apparatuses, and non-transitory computer-readable medium described herein may further include operations, features, means, or instructions for configuring the RRM measurement periodicity based on one or more RRM measurements performed by the UE.

In some examples of the method, apparatuses, and non-transitory computer-readable medium described herein, the wake-up signal periodicity corresponds to one or more DRX cycles. Some examples of the method, apparatuses, and non-transitory computer-readable medium described herein may further include operations, features, means, or instructions for transmitting, within the configuration, an indication that a page monitoring periodicity includes one or more RRM measurement periods.

Some examples of the method, apparatuses, and non-transitory computer-readable medium described herein may further include operations, features, means, or instructions for transmitting a system information change notification within a paging message, where the paging message may be transmitted according to the RRM measurement periodicity.

DETAILED DESCRIPTION

Figure 1:
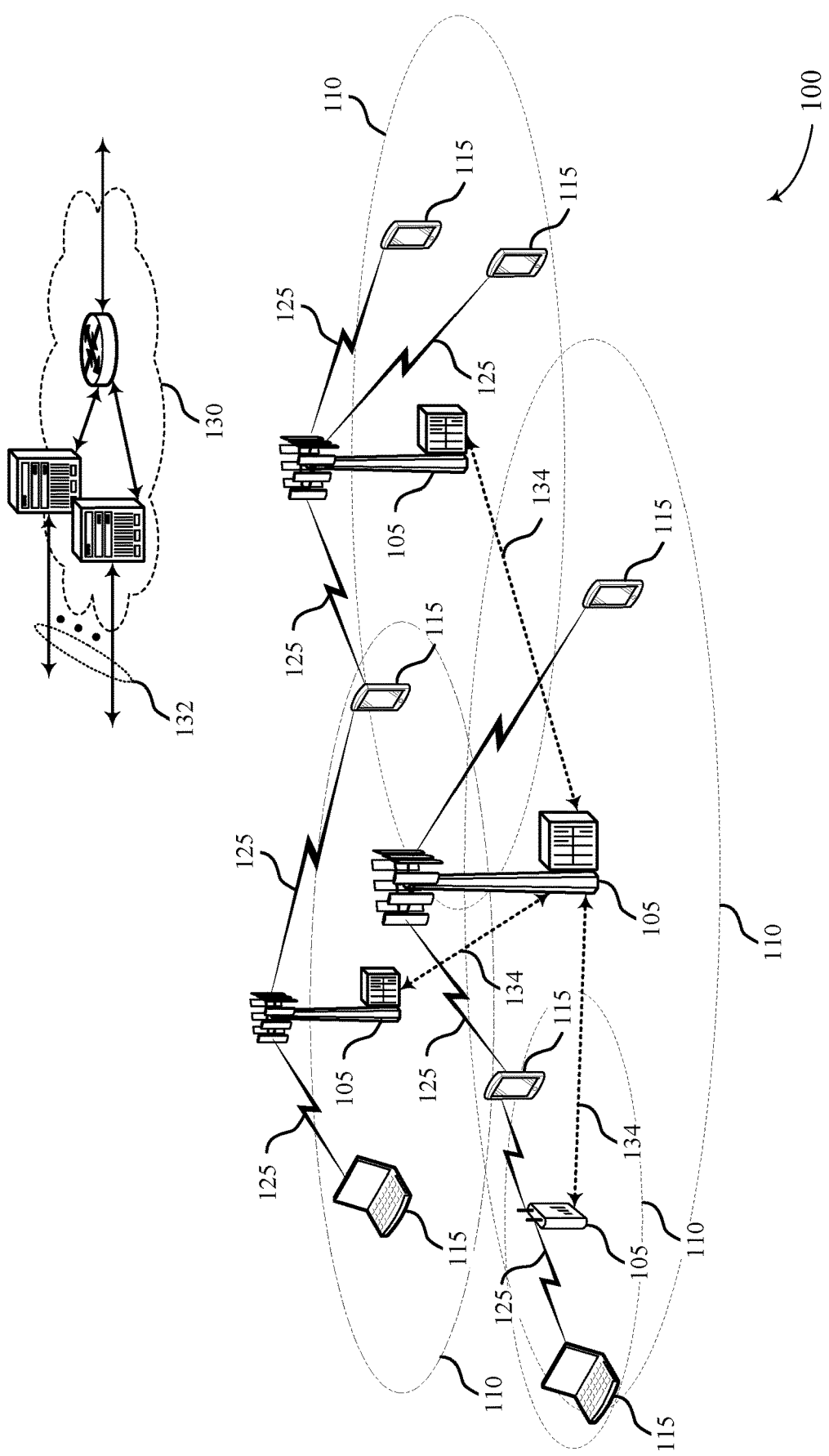
FIG. 1 illustrates an example of a system for wireless communication that supports a radio resource management (RRM) configuration for user equipment (UEs) with wake-up signal (WUS) receivers in accordance with aspects of the present disclosure.

In a wireless communication system, a base station may signal that paging and/or system information is available in a channel for one or more user equipment (UEs). For example, the base station may send pages or paging messages to a UE indicate that information is available for the UE. In some cases, the paging messages may carry an indication of a change in system information (e.g., a modification of a system information block (SIB)). In some examples, the paging messages may be sent during paging occasions (POs) of a downlink control channel. The downlink control channel may be a physical downlink control channel (PDCCH) or a narrowband (NB)-PDCCH. POs may be periodic intervals configured for paging messages to allow the UEs to enter a sleep or discontinuous reception (DRX) state in between POs, and this process may be referred to as idle mode paging. In some examples, the paging information may be sent in a physical downlink shared channel (PDSCH), which may be sent during the same transmission time interval (TTI) (e.g., subframe) as the PDCCH or during a different TTI.

A base station may use a physical signal (e.g., a wake-up signal (WUS)) to indicate that a UE should decode a subsequent downlink physical channel (e.g., PDCCH or PDSCH) in idle mode paging. The WUS may further serve to optimize power consumption at the UE. In some cases, the base station may introduce a periodic synchronization signal (SS) (e.g., a primary SS (PSS), a secondary SS (SSS), and the like) in combination with the WUS to ensure sufficient synchronization performance. In other cases, the base station may refrain from transmitting the periodic SS with the WUS or in a discontinuous transmission (DTX) mode.

In some cases, the network may change one or more information fields pertaining to system information. Further, the network may transmit a paging message indicating that the system information has been modified. For instance, the network may update a field or information element within the paging message pertaining to a modification in system information. Upon receiving a paging message indicating the change in system information, the UE may attempt to monitor for additional details pertaining to the change in system information. A UE capable of, and configured for, detecting a WUS, may detect the WUS based on a WUS periodicity configured by higher layers.

In some cases, however, if the UE is configured to utilize the WUS for power saving, the UE may not read a downlink channel (e.g., PDCCH/PDSCH) if a WUS is not detected. In some circumstances, the UE may miss a WUS, even though a WUS was transmitted for a paging message. For instance, a large maximum coupling loss (MCL) due to a size of a coverage area, frequency offset, time drift, or inter-cell interference with a neighboring base station may lead to a missed WUS. Additionally or alternatively, network errors, such as a base station reset, may lead to a change in a WUS configuration. For example, a base station may restart in a safe mode due to an electrical issue, causing a loss in WUS operation. If a UE is unable to detect the WUS correctly, the UE may miss important changes in system information in paging information, hampering the UE's performance.

As described herein, to alleviate network and/or UE performance degradation experienced with missed changes in system information, the network may configure a UE to monitor paging information periodically, even when a configured WUS is not detected. For instance, the network may configure the UE with a page monitoring periodicity to enable or trigger a UE to monitor paging information. The configuration may be explicitly signaled (e.g., via a SIB, a Radio Resource Control (RRC) configuration, a higher layer parameter, or the like), implicitly signaled, or may be determined based on preconfigured parameters. The configuration used for monitoring for the paging message may be referred to as a page monitor periodicity without WUS, and may enable the UE to periodically monitor for paging information according to a cycle configured by the network. For example, the base station or network may configure the UE to monitor paging information according to a cycle related to the PO periodicity, the WUS periodicity, radio resource management (RRM) measurement periodicity, or a modification period related to system information modification.

Aspects of the disclosure are initially described in the context of a wireless communications system. Aspects are the disclosure are then described with reference to timing diagrams. Aspects of the disclosure are further illustrated by and described with reference to apparatus diagrams, system diagrams, and flowcharts that relate to fallback mode for wake-up signal receivers.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an Si or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may include of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may include of one or multiple symbol periods. In some cases, the TTI duration (that is, the number of symbol periods in a TTI) may be variable.

Wireless communications systems, such as an NR system, may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some cases, a UE 115 may monitor a communication link 125 continuously for an indication that the UE 115 may receive data. In other cases (e.g., to conserve power and extend battery life) a UE 115 may be configured with a discontinuous reception (DRX) cycle. A DRX cycle may include an "On Duration" when the UE 115 may monitor for control information (e.g., on PDCCH) and a "DRX period" when the UE 115 may power down radio components. In some cases, a UE 115 may be configured with a short DRX cycle and a long DRX cycle. In some cases, a UE 115 may enter a long DRX cycle if it is inactive for one or more short DRX cycles. The transition between the short DRX cycle, the long DRX cycle and continuous reception may be controlled by an internal timer or by messaging from a base station 105. A UE 115 may receive scheduling messages on PDCCH during the On Duration. While monitoring PDCCH for a scheduling message, the UE 115 may initiate a "DRX Inactivity Timer." If a scheduling message is successfully received, the UE 115 may prepare to receive data and the DRX Inactivity Timer may be reset. When the DRX Inactivity Timer expires without receiving a scheduling message, the UE 115 may move into a short DRX cycle and may start a "DRX Short Cycle Timer." When the DRX Short Cycle Timer expires, the UE 115 may resume a long DRX cycle. In some cases, there may be a one-to-one relationship between a PO and a DRX cycle. Additionally, in extended DRX (eDRX) there may be two periodicities configured, where one may define an eDRX periodicity and the other defines the PO periodicity, which may include a number of POs to monitor at a start of every eDRX periodicity and determined by a paging time window (PTW).

In wireless communications system 100, a base station 105 may signal a change in system information to a UE 115 via a page or paging message. The paging message may carry an indication of the change in system information and may also indicate that paging information is available for one or more UEs 115 associated with the base station 105. A UE 115 may periodically monitor for paging messages transmitted from the base station during POs. A PO may be a TTI where a downlink channel such as a PDCCH or PDSCH addresses the paging message. A base station 105 in wireless communications system 100 may use a WUS during idle-mode paging to indicate if the UE 115 needs to decode a particular physical downlink channel to determine whether there is a change in system information. In some cases, the UE 115 may refrain from monitoring POs until a WUS has been detected prior to a PO. To ensure notifications pertaining to changes in system information are not missed (e.g., should a transmitted WUS not be received), the network may configure a UE 115 to monitor POs regardless of an absence of a WUS. A paging monitor periodicity without WUS may be configured and may enable the UE 115 to periodically monitor for paging information according to a cycle configured by the network. For example, the base station 105 or network may configure the UE 115 to monitor paging information according to a cycle related to the PO periodicity, the WUS periodicity, RRM measurement periodicity, or a modification period related to system information modification.

Figure 2:
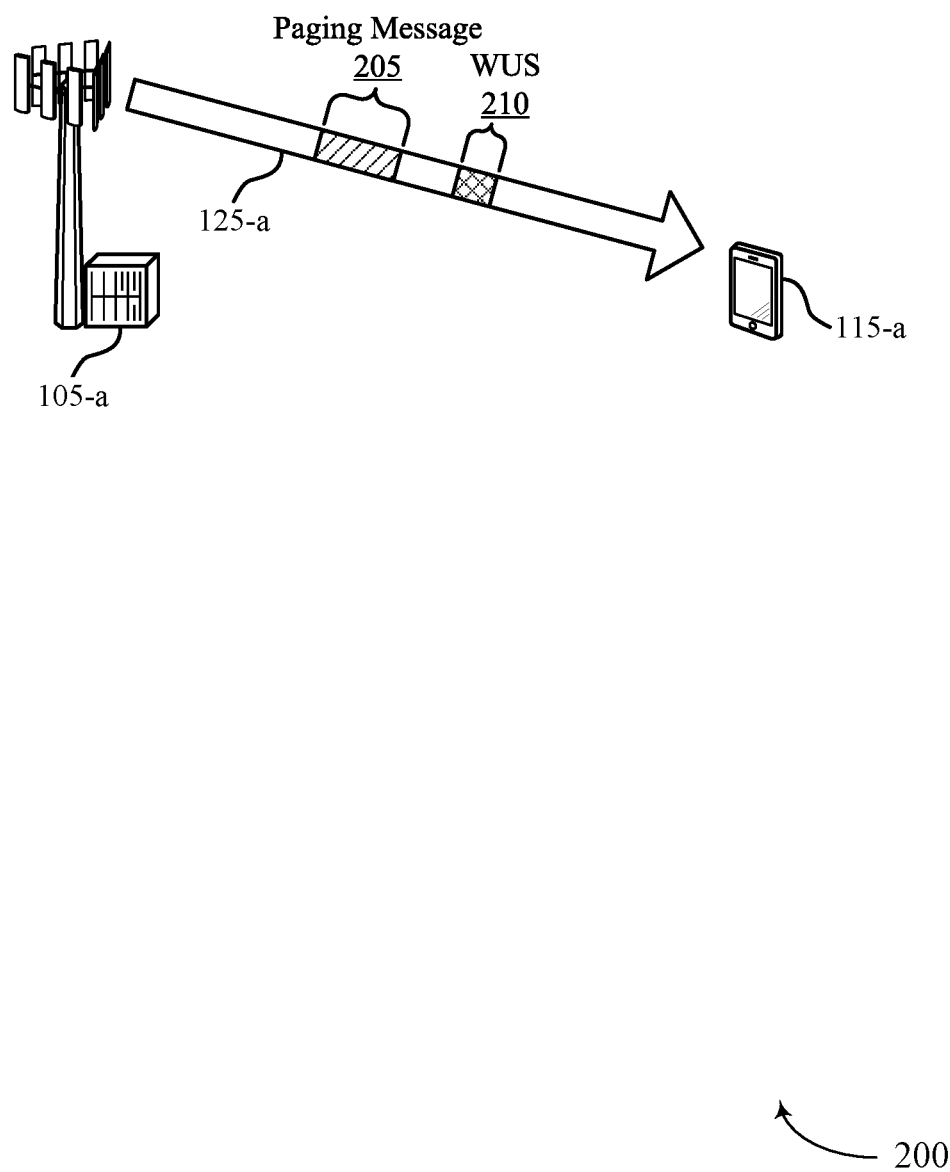
FIG. 2 illustrates an example of a wireless communication system that supports an RRM configuration for UEs with WUS receivers in accordance with aspects of the present disclosure.

FIG. 2 illustrates an example of a wireless communication system 200 that supports an RRM configuration for UEs with WUS receivers in accordance with various aspects of the present disclosure. In some examples, wireless communications system 200 may implement aspects of wireless communications system 100. Wireless communications system 200 may include base station 105-a and UE 115-a, which may be examples of the corresponding devices described with reference to FIG. 1. Base station 105-a and UE 115-a may be in communication with each other over communication link 125-a. In some cases, wireless communications system 200 may operate in mmW spectrum, or may support radio technologies such as NB-IoT, or eMTC.

In wireless communications system 200, base station 105-a may send pages or paging messages 205 to one or more UEs 115, including UE 115-a, to indicate that information (such as downlink data or other information) is available for one or more of the UEs 115. In some cases, the paging messages 205 may also carry an indication of a change in system information (e.g., in a SIB). The paging messages 205 may be sent using POs of a downlink control channel, where the downlink control channel may be a PDCCH or a NB-PDCCH. POs may be periodic intervals configured for paging messages 205 to allow UE 115-a to enter a sleep or DRX state in between POs, and this process may be referred to as idle mode paging. In some examples, the paging information may be sent in a PDSCH, which may be sent during the same TTI as a PDCCH or during a different TTI than the PDCCH.

In some cases, base station 105-a may use a power saving physical signal (e.g., WUS 210) to indicate if UE 115-a should decode a subsequent downlink physical channel (e.g., PDCCH or PDSCH) in idle mode paging. In some cases, WUS 210 may serve to optimize power consumption at UE 115-a, for example, where UE 115-a may rely on receipt of WUS 210 before waking from a sleep state. In some cases, base station 105-a may introduce a periodic synchronization signals (e.g., PSS or SSS) in combination with WUS 210 (and/or with DTX) to ensure sufficient synchronization performance. In other cases, base station 105-a may not introduce periodic synchronization signals in a WUS mode (which may also correspond to a DTX mode).

In some cases, the network or base station 105-a may change one or more information fields pertaining to a SIB. In such cases, base station 105-a may proceed to transmit the modified SIB, as well as another SIB (e.g., SIB1) with an updated field (e.g., systemInfoValueTag). Further, base station 105-a may transmit paging message 205 with an indication that the system information has been modified. For instance, the base station 105-a may update a field or information element within paging message 205 pertaining to a modification in system information (e.g., systemInfoModification). In some cases, the field may comprise a Boolean value and may, for example, be set to "true" (e.g., using Boolean logic with a bit value of '1').

Upon receiving paging message 205 indicating a change in system information (e.g., systemInfoModification=true), UE 115-a may attempt monitoring for SIB1 for additional details pertaining to the change in system information. For instance, the systemInfoValueTag transmitted within SIB1 may change during a modification period, and may provide an indication of the change in system information. In some cases, the modification period may be specified in another system information block (e.g., modificationPeriodCoeff in SIB2). In some cases, UE 115-a may determine that the system information changes at the boundary of a next modification period.

In some cases, UE 115-a may be capable of and configured to detect WUS 210, and may thus detect WUS 210 based on a WUS periodicity configured by higher layers. Thus, if UE 115-a is configured to detect WUS 210 for power saving, UE 115-a may not read a downlink channel, such as PDCCH or PDSCH, if WUS 210 is not detected. In some circumstances, however, UE 115-a may miss WUS 210 even though WUS 210 was transmitted for paging message 205. For instance, a large MCL due to a relatively large coverage area, frequency offset, time drift, or inter-cell interference with a neighboring base station 105 (not shown) or another device may lead to a missed WUS 210. In some cases, network errors or a reset at base station 105-a (e.g., due to a power failure) may lead to a change in a WUS configuration. For example, base station 105-a may restart in safe mode due to an electrical issue, causing a loss in WUS operation. As a result, if UE 115-a is incapable of detecting WUS 210 correctly, UE 115-a may miss important changes in system information conveyed by the paging information within paging message 205, which may affect the performance of UE 115-a.

To alleviate network and/or UE performance impacted due to missing changes in system information, base station 105-a may configure UE 115-a to monitor paging information periodically. That is, even when WUS 210 is missed by (e.g., not received) UE 115-a, UE 115-a may monitor for paging information sent from base station 105-a. For instance, base station 105-a may configure UE 115-a with a "page monitoring periodicity without WUS" to enable or trigger UE 115-a to monitor paging information outside of the receipt of WUSs. In some cases, the configuration may be signaled explicitly (e.g., via SIB, RRC, or through a higher layer parameter). For example, paging time window (PTW) and DRX parameters may be negotiated via non-access stratum (NAS) signaling messages, and the page monitoring periodicity configuration may be indicated via such NAS signaling. In other cases, base station 105-a may utilize a predefined parameter to configure UE 115-a with page monitoring periodicity without WUS. For instance, base station 105-a may set a maximum time span during which the UE 115-a may skip monitoring WUS 210 at least once. Skipping monitoring WUS 210 may correspond to monitoring paging information in the absence of WUS 210. In some cases, the configuration may be signaled implicitly, for example, by stating a relationship between the 'page monitoring periodicity without WUS' and another parameter, such as a DRX cycle.

As described herein, these techniques may enable a fallback mode for UE 115-*a* when configured to operate using WUSs 210 to periodically monitor for paging message 205. In such cases, the periodicity by which UE 115-*a* wakes to monitor for paging message 205 may be dynamically configured, allowing for different levels of protection against missed/failed reception of WUS 210. For instance, base station 105-*a* may configure the page monitoring periodicity based on channel conditions or interference experienced within a cell. Accordingly, the page monitoring periodicity may be configured for UE 115-*a* to wake up more or less frequently based at least on part on the dynamic configuration of the page monitoring periodicity.

In some examples, the use of the fallback mode may enable efficient communications when UE 115-*a* is mobile. For instance, UE 115-*a* may be travelling between different cells. The respective cells may each support the use of WUSs, and UE 115-*a* may have information associated with WUSs used by a neighboring cell (e.g., a cell that previously served UE 115-*a* before UE 115-*a* moved into a cell provided by base station 105-*a*). Upon moving into the cell provided by base station 105-*a*, UE 115-*a* may not immediately have information (e.g., a configuration) associated with a WUS 210 transmitted by base station 105-*a*. As such, the use of the fallback mode, where UE 115-*a* may wake up to obtain paging information from base station 105-*a* without relying on receipt of WUS 210 (e.g., based on a page monitoring periodicity), may enable UE 115-*a* to obtain paging information (and system information indicated by paging messages) from base station 105-*a*. UE 115-*a* may thus skip the detection of WUS 210 and may detect paging messages directly, where the use of such techniques may be based on UE 115-*a* moving between cells.

Figure 3:
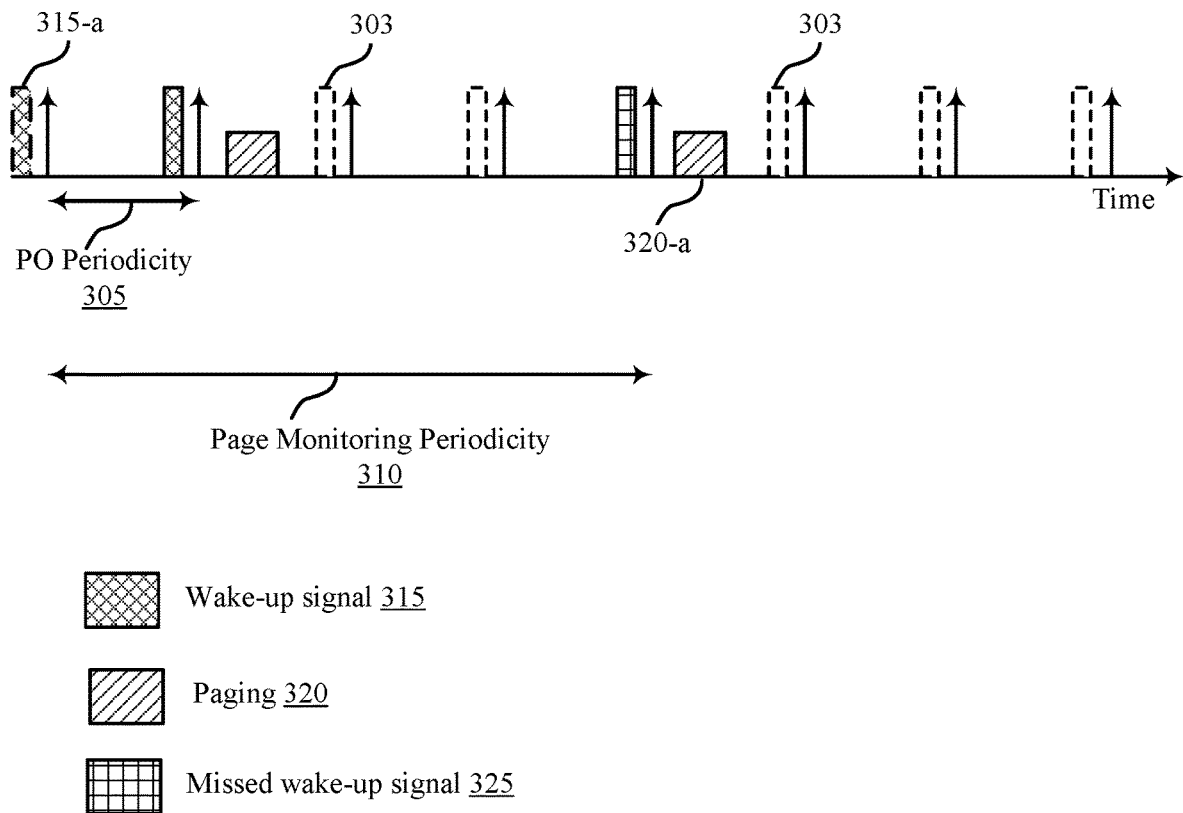
FIGS. 3 through 6 illustrate examples of timing diagrams in a system that supports an RRM configuration for UEs with WUS receivers in accordance with aspects of the present disclosure.

FIG. 3 illustrates an example of a timing diagram 300 in a system that supports an RRM configuration for UEs with WUS receivers in accordance with various aspects of the present disclosure. In some examples, timing diagram 300 may implement aspects of wireless communications system 100 and/or 200. Timing diagram 300 shows an example of how a UE 115 may utilize a wake-up periodicity for idle mode paging while employing a page monitoring periodicity without WUS.

Timing diagram 300 may illustrate a depiction of what occurs at the PHY layer for a UE 115 configured with page monitoring periodicity without WUS by a network. In a first deployment scheme of a page monitoring without WUS, the network may configure a UE 115 to periodically detect (e.g., every X POs or X DRXs) a downlink channel (e.g., PDCCH or PDSCH) comprising paging information 320, where each DRX cycle may include one PO. As illustrated in timing diagram 300, WUS occasions 303 may represent occasions during which a base station 105 may transmit a WUS, which may be detected by the UE 115. Additionally, the time period between POs may be depicted by PO periodicity 305, and page monitoring periodicity 310 denotes the page monitoring periodicity without WUS having an X*DRX periodicity. In the example illustrated in timing diagram 300, X=4. However, X may be any integer, where X≥1.

In some cases, a WUS 315 (e.g., WUS 315-*a*) may inform the UE 115 to monitor one PO in a DRX cycle. For instance, if X=1, a UE 115 may fallback to a mode and assume that no WUS 315 is enabled. In such cases, the UE 115 may monitor for a downlink channel (PDCCH/PDSCH) in each PO. In other cases, if X>1 (e.g., X=8, X=16, etc.), the page monitoring periodicity without WUS may be set to "X*DRX." In such cases, the UE 115 may monitor a downlink channel for paging information 320 every X DRXs or X POs, regardless of the presence or detection of a WUS 315. In some cases, as illustrated in timing diagram 300, a UE 115 configured with X*DRX periodicity may miss WUS 325. The UE 115, however, may still proceed to detect paging information 320-*a* due to being configured with page monitoring periodicity 310. That is, regardless of the missed WUS 325, the UE 115 may proceed to wake up from a sleep state to receive paging information 320-*a*.

Figure 4:
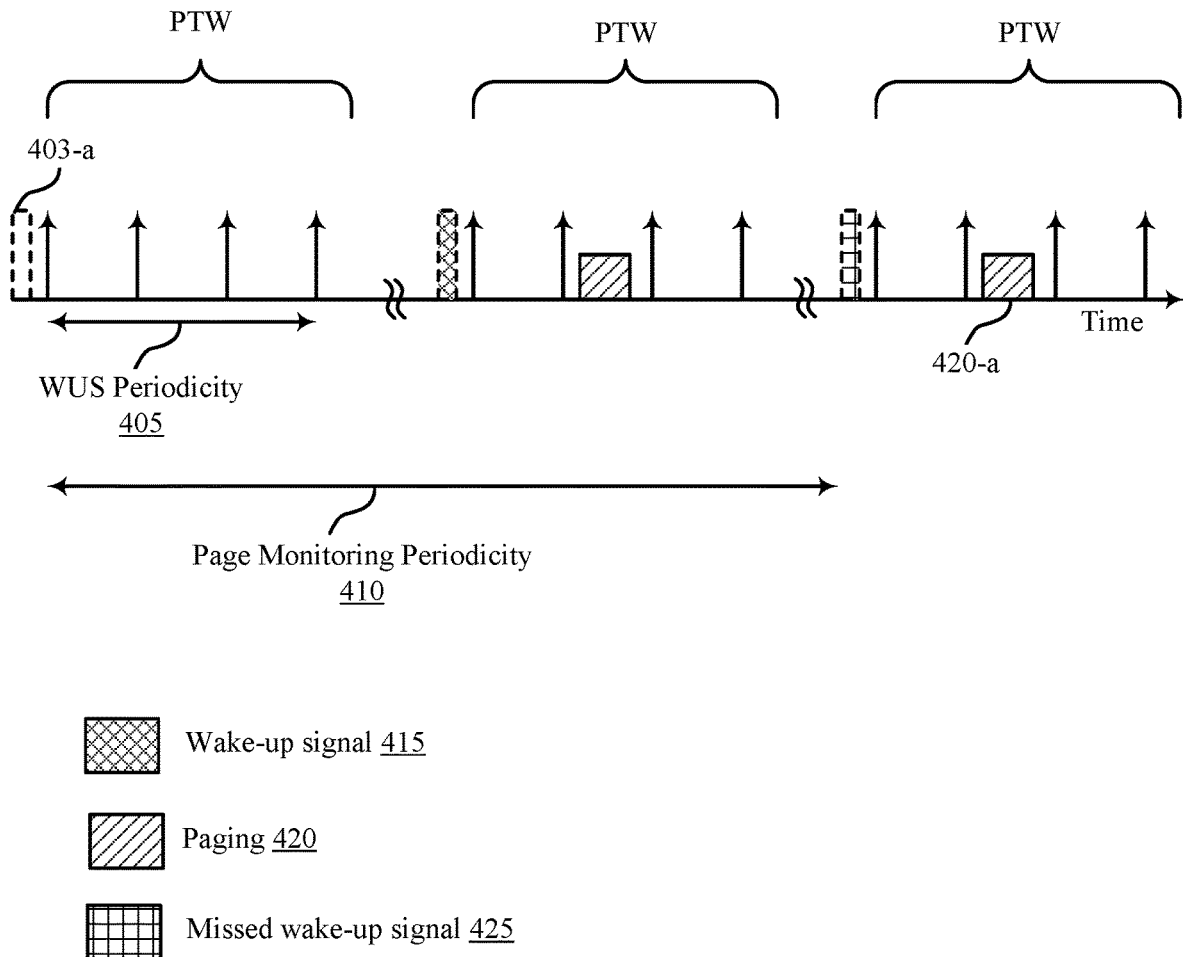

FIG. 4 illustrates an example of a timing diagram 400 in a system that supports an RRM configuration for UEs with WUS receivers in accordance with various aspects of the present disclosure. In some examples, timing diagram 400 may implement aspects of wireless communications system 100 and/or 200. Timing diagram 400 shows an example of how a wake-up cycle for idle mode paging may operate while employing a page monitoring periodicity without WUS. The timing diagram 400 may illustrate a depiction of what occurs at the PHY layer for a UE 115 configured with page monitoring periodicity without WUS by the network. In the example illustrated by timing diagram 400, a network may configure a UE 115 to detect a downlink channel for paging information every Y WUS occasions, where Y≥1. Unlike the example described with reference to FIG. 3, the granularity of paging information detection in this example may be based on a WUS, and not a PO.

In some cases, WUS occasions 403 may represent occasions during which a base station 105 may transmit a WUS 415, which may be detected by the UE 115. However, as illustrated in timing diagram 400, a WUS 415 (e.g., at WUS occasion 403-*a*) may inform a UE 115 to monitor one PO or multiple POs within a PTW in an extended DRX (eDRX) cycle (e.g., there may be one WUS 415 every Y POs, where Y≥1). The WUS periodicity 405 may be equal to Y*PO periodicity (or Y*DRX). In some cases, if Y=1, the UE 115 may fallback to a particular mode and assume that no WUS 415 is enabled. In such cases, the UE 115 may monitor for paging information 420 in one or more POs within a PTW in the eDRX cycle. As illustrated, the time period when WUSs 415 may be transmitted may be depicted by WUS periodicity 405, and page monitoring periodicity 410 may represent a page monitoring periodicity without WUS, which may have a page monitoring periodicity 410 equal to Y*WUS periodicity 405. That is, in cases where Y≥1 (e.g., Y=4, 8, 16, etc.), the page monitoring periodicity without WUS may be set to Y*WUS periodicity 405. The UE 115 may monitor downlink channel(s) for paging information 420 regardless of detecting a WUS 415 to reduce the probability of missing changes to system information or other information that may affect communications efficiency of the UE 115. For instance, as illustrated in timing diagram 400, a UE 115 configured a page monitoring periodicity 410 having a Y*WUS periodicity 405 may miss WUS 425. However, the UE 115 may still detect paging information 420-*a* due to being configured with the page monitoring periodicity without WUS.

Figure 5:
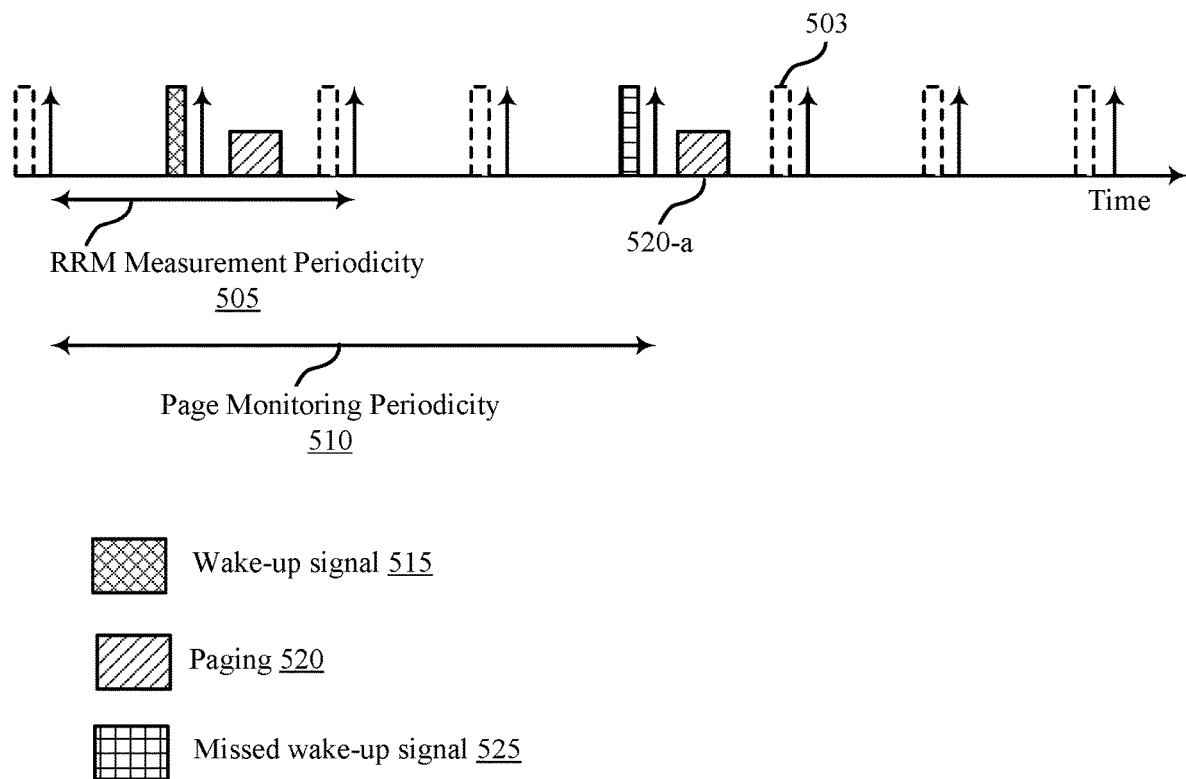

FIG. 5 illustrates an example of a timing diagram 500 in a system that supports an RRM configuration for UEs with WUS receivers in accordance with various aspects of the present disclosure. In some examples, timing diagram 500 may implement aspects of wireless communications system 100 and/or 200.

In a third deployment scheme of paging monitoring without WUS, a network may configure a UE 115 to detect downlink channels for paging every M RRM measurement periods, where M≥1. For instance, In some cases, a RRM measurement may include measuring an RSRP, an RSRQ, confirming a serving cell or camping cell, etc. In some examples, the measurements may indicate a mobility condition of the UE 115 (e.g., a low-mobility UE 115). As illustrated in timing diagram 500, WUS occasions 503 may represent occasions during which a base station 105 may transmit a WUS 515, which may be detected by a UE 115. In some cases, the UE 115 may not perform RRM measurements in every DRX cycle, enabling power savings at the UE 115.

Further, RRM measurements may be performed according to an RRM measurement periodicity 505 configured by the network. That is, the network may determine whether a UE 115 may use an RRM measurement periodicity 505 having a certain duration, and accordingly provide the configuration of the RRM measurement periodicity 505 to the UE 115. In one example, the network may configure RRM measurement periodicity 505 based on RRM measurements performed by a UE 115. For instance, previous RRM measurements performed by the UE 115 (e.g., for a serving cell) may have variation within a pre-determined threshold, and a base station 105 may indicate a longer RRM measurement periodicity 505 configured for the UE 115 (e.g., based on the variation). In some cases, RRM measurements may be based on synchronization signals (e.g., PSS, SSS, re-sync SS for eMTC, narrowband PSS (NPSS) or narrowband SSS (NSSS) for NB-IoT), reference signals (e.g., cell-specific reference signal (CRS), narrowband reference signal (NRS) for NB-IoT), or a combination thereof.

In some cases, if M=1, the UE 115 may monitor for a notification pertaining to a change in system information indicated by paging at least once every RRM measurement period. In other cases, if M≥1 (e.g., M=4, 8, 16, etc.), a page monitoring periodicity without WUS may be set to M*RRM measurement periodicity 505, as shown by page monitoring periodicity 510. Thus, the UE 115 may monitor for paging information 520 every M RRM measurement periods, regardless of whether a WUS is detected or not. For instance, as illustrated in timing diagram 500, a UE 115 configured with a page monitoring periodicity 510 equivalent to M*RRM measurement periodicity 505 may miss WUS 525. However, the UE 115 may still proceed to detect paging 520-a due to being configured with a page monitoring periodicity without WUS.

In some cases, a UE 115 may include different receivers (e.g., receiver chains, antennas, antenna arrays, etc.) for detecting a WUS and performing RRM measurements. For instance, the UE 115 may use a first receiver for monitoring paging and performing RRM measurements, while the UE 115 may use a second receiver (e.g., having a lower power than the first receiver) for detecting a WUS. Thus, when the UE 115 switches on the first receiver for performing RRM measurements, the UE 115 may detect paging while the receiver is still on. Such techniques may further serve to optimize power consumption at the UE 115, where the UE 115 may refrain from waking on additional occasions, and may instead detect paging information while performing RRM measurements.

In some cases, the UE 115 may perform RRM measurements prior to each WUS occasion. In such cases, RRM measurements may be modified or relaxed to further optimize power consumption at the UE 115. For instance, to perform RRM measurements prior to receiving a WUS, the UE 115 may synchronize (e.g., using a received WUS) or wake-up the receiver associated with RRM measurements (e.g., the first receiver) in addition to monitoring for the WUS. In some cases, the UE 115 may limit performing RRM measurements to efficiently utilize its receiving resources. For instance, the UE 115 may perform RRM measurements once every P DRX cycles, where P may be an integer greater than 1. In such cases, the RRM measurements may be performed less frequently (e.g., as compared to performing RRM measurements during every DRX cycle), thereby enabling the UE 115 to remain in a power saving mode for a longer duration of time. Additionally or alternatively, when RRM measurements have a relaxed periodicity (e.g., using less frequent RRM measurement occasions), a UE 115 may utilize the WUS received during an RRM measurement period to synchronize with a base station 105. In such cases, the WUS may be configured for every DRX cycle, but the UE 115 may only wake-up every P DRX cycles, when the WUS may be detected.

In some cases, the UE 115 may perform RRM measurements once every R=X POs=X WUS occasions, where each PO may be configured with one WUS. In some other cases, the UE 115 may perform RRM measurements once every R=Y WUS occasions, if POs are configured with more than one WUS, for example, in eDRX, as described in the deployment schemes above. In some cases, if there is a WUS detected within the R WUS occasions, the UE 115 may perform RRM measurements and monitor paging after detecting a WUS. In other examples, if no WUS is detected within the R WUS occasions, the UE 115 may perform RRM measurements at the Rth occasion.

Figure 6:
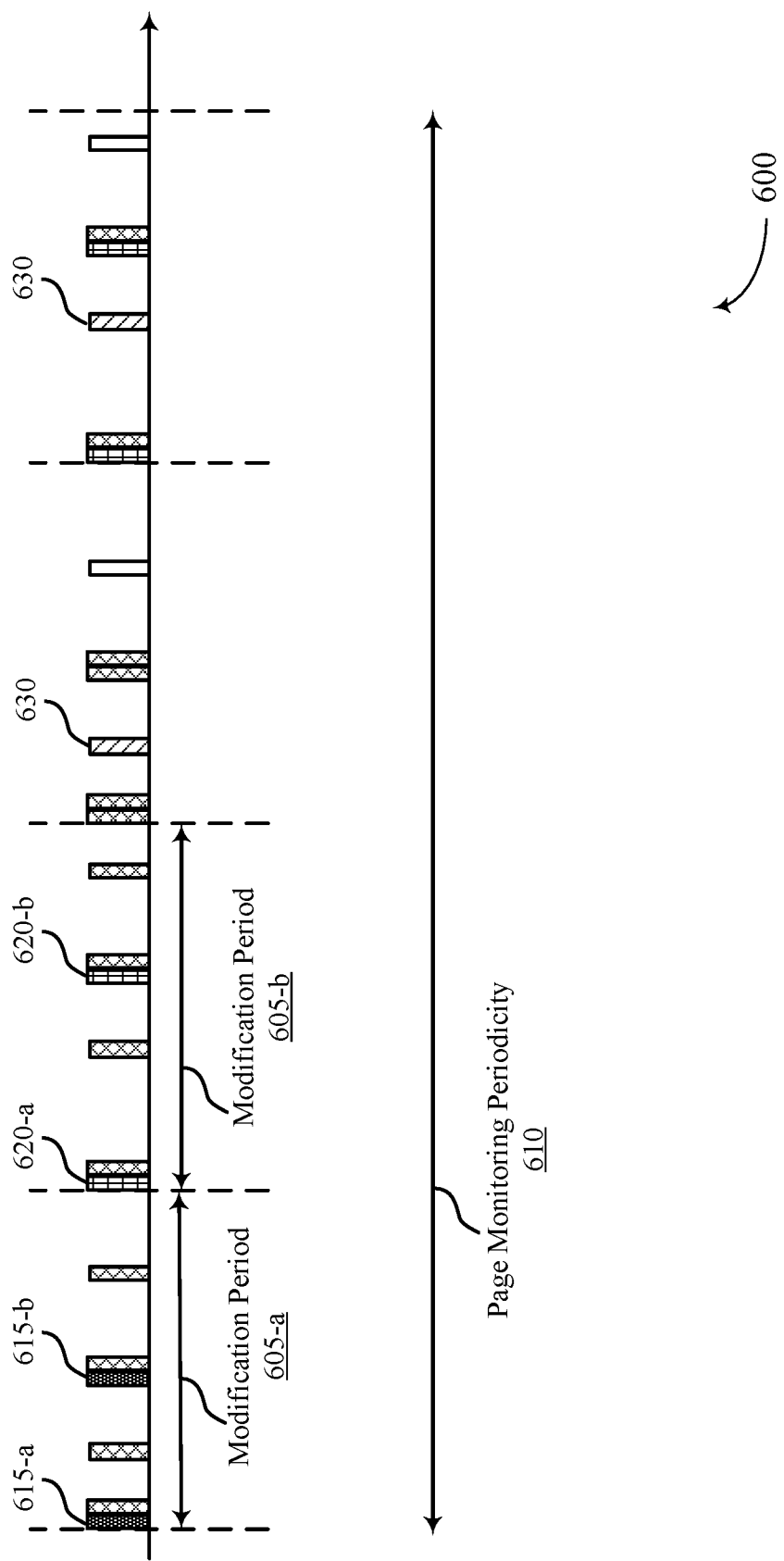

FIG. 6 illustrates an example of a timing diagram 600 in a system that supports an RRM configuration for UEs with WUS receivers in accordance with various aspects of the present disclosure. In some examples, timing diagram 600 may implement aspects of wireless communications system 100 and/or 200. Timing diagram 600 may illustrate modification periods deployed in some wireless communication systems, which are used to notify a UE 115 of a change in system information.

In some cases, change of system information may occur during specific radio frames, and the same system information may be transmitted within a modification period. As illustrated in timing diagram 600, different shading patterns indicate different system information. Further, modification period 605-a (e.g., a broadcast control channel (BCCH) modification period) denotes the change notification time period (or modification period (n)), whereas modification period 605-b (e.g., another BCCH modification period) denotes the time period where updated system information is transmitted (modification period (n+1)). For instance, system information 615-a and 615-a in modification period 605-a may be updated to system information 620-a and 620-b, respectively, in modification period 605-b. In some examples, other signals of timing diagram 600 with the same shading patterns in modification periods 605-a and 605-b (and any subsequent modification periods 605), may remain unchanged. For instance, a signal 630 may not change (or be modified) from one modification period 605 to the next.

In a fourth deployment scheme of page monitoring periodicity without WUS, the network may configure a UE 115 to monitor a notification pertaining to changes in system information in paging and/or SIB1 (or MIB) every N modification periods, where N≥1. For instance, similar to the deployment schemes described above, if N=1, the UE 115 may monitor a notification related to system information change in a paging message, SIB1 or MIB, or a combination thereof, during every modification period 605. Information pertaining to the modification period 605 may be received in another SIB, such as SIB2. In some other cases, if N≥1, the page monitoring periodicity without WUS may be set at N*modification period 605-*b*, as illustrated by page monitoring periodicity 610. Thus, the UE 115 may monitor paging every N modification periods 605. Further, N may be different based on the type of radio technology deployed at the UE 115 (e.g., eMTC, NB-IoT, etc.).

In some cases, the UE 115 may autonomously decide when to perform one or more RRM measurements within R WUS occasions, as described with reference to FIG. 5. In an alternate scheme of performing RRM measurements in conjunction with WUS detection, the UE 115 may carry out RRM measurements when configured by the network or base station to read downlink channels such as PDCCH or PDSCH carrying paging information, regardless of the presence or detection of WUS (i.e., according to the configured page monitor periodicity 610 without WUS). For instance, if the page monitor periodicity 610 may be configured as N*modification period, the UE 115 may perform RRM measurements as well as cell confirmation (i.e., for serving cell or camping cell) when there is a potential change in system information, regardless of detecting a WUS.

Figure 7:
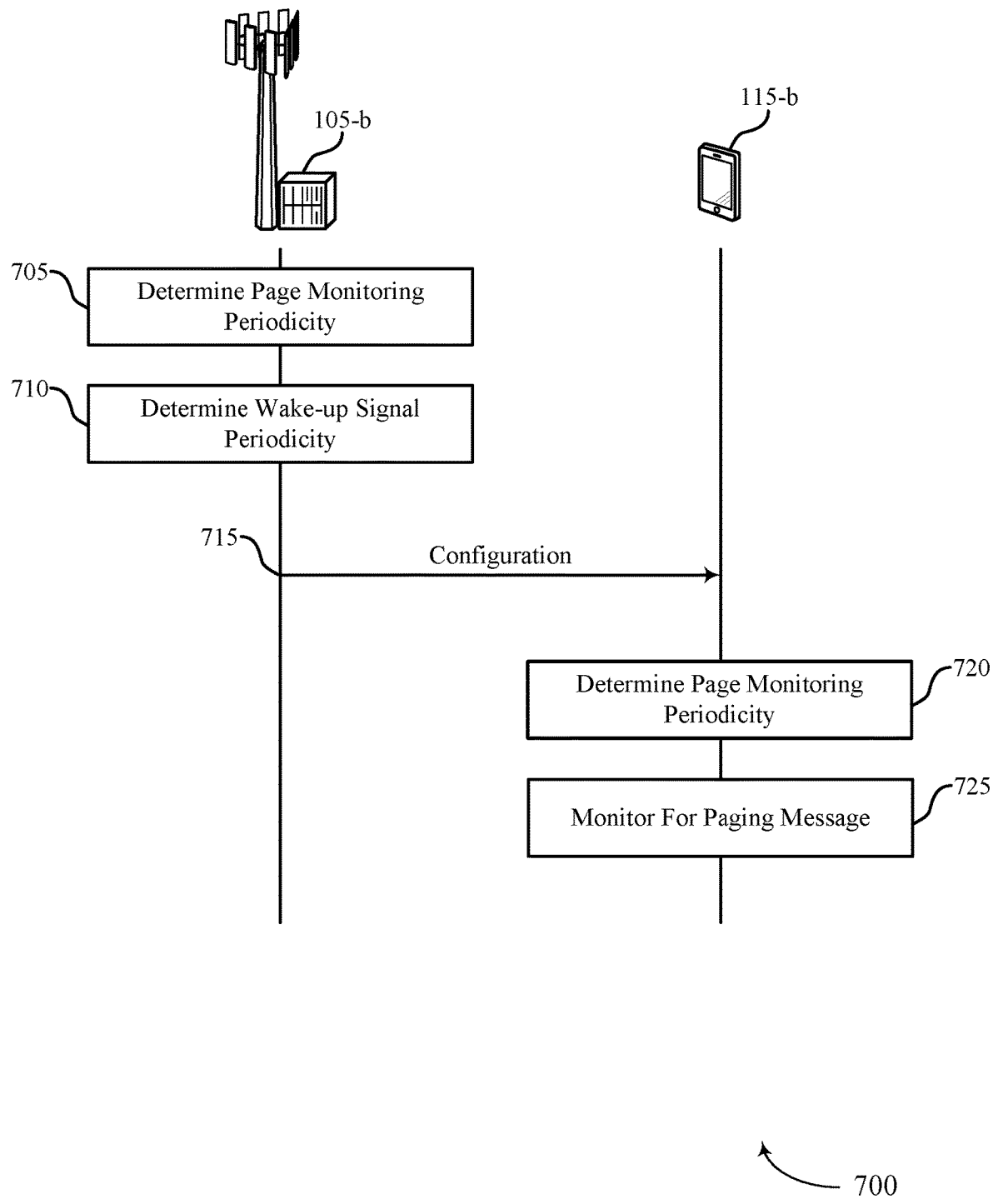
FIG. 7 illustrates an example of a process flow in a system that supports an RRM configuration for UEs with WUS receivers in accordance with aspects of the present disclosure.

FIG. 7 illustrates an example of a process flow 700 that supports an RRM configuration for UEs with WUS receivers in accordance with various aspects of the present disclosure. In some examples, process flow 700 may implement aspects of wireless communications system 100 and/or 200. Further, process flow 700 may be implemented by a UE 115-*b* and a base station 105-*b*, which may be examples of a UE 115 and a base station 105 as described with reference to FIGS. 1 and 2. In some examples, the process illustrated by process flow 700 may be implemented in an NR wireless system, and may support the use of a page monitoring periodicity for the efficient detection of paging messages by a UE 115.

At 705, base station 105-*b* may determine a page monitoring periodicity (e.g., "page monitoring periodicity without WUS") for configuring UE 115-*b* to monitor for a paging message. In some wireless communication systems, WUSs may be deployed as power saving signals, enabling a UE to remain in idle mode until a paging message of a PO indicates a change in system information, or paging information for the UE. At 710, base station 105-*b* may thus determine a WUS periodicity for a plurality of WUSs, where the WUS periodicity may be less than or equal to the page monitoring periodicity.

At 715, base station 105-*b* may transmit, and UE 115-*b* may receive, a configuration of the page monitoring periodicity. In some examples, the page monitoring configuration may optionally indicate a relationship between the page monitoring periodicity determined at 705, and the WUS periodicity determined at 710. In some cases, base station 105-*b* may transmit, within the configuration, an indication that the page monitoring periodicity comprises one or more POs, or an indication that the page monitoring periodicity comprises one or more WUS occasions, or an indication that the page monitoring periodicity comprises one or more RRM measurement periods, or a combination thereof. In some cases, the configuration may also provide an indication that the page monitoring periodicity comprises one or more BCCH modification periods. The configuration may be transmitted via a system information message, a RRC message, or a NAS message.

At 720, UE 115-*b* may determine the page monitoring periodicity, for example, based on the received configuration. For instance, UE 115-*b* may determine that the page monitoring periodicity includes one or more POs based on the configuration (e.g., the page monitoring periodicity is X*DRX periodicity, as described above with reference to FIG. 3), where a WUS periodicity may also correspond to the one or more POs. In such cases, the configuration may cover both DRX (where there is only one PO) and eDRX (where there are one or more POs determined by a PTW). For example, UE 115-*b* may determine that the page monitoring periodicity includes one or more WUS occasions based on the configuration, where the WUS periodicity corresponds to a PTW periodicity that includes one or more POs (e.g., the page monitoring periodicity is X*WUS periodicity, as described above with reference to FIG. 4).

In some examples, UE 115-*b* may determine that the page monitoring periodicity comprises one or more RRM measurement periods based on the configuration (e.g., the page monitoring periodicity is X*RRM measurement periodicity, as described above with reference to FIG. 5). Additionally or alternatively, UE 115-*b* may determine that the page monitoring periodicity comprises one or more BCCH modification periods based on the configuration (e.g., as described with reference to FIG. 6).

At 725, UE 115-*b* may proceed to perform discontinuous monitoring for a plurality of WUSs based on the WUS periodicity, and monitor paging messages during a page monitoring period according the page monitoring periodicity, or the WUS periodicity, or a WUS received based on the WUS periodicity, or a combination thereof. For example, UE 115-*b* may monitor for the paging message according to the PO periodicity and the received WUS. In other cases, UE 115-*b* may monitor for the paging message according to the PTW periodicity and the received WUS. Additionally or alternatively, UE 115-*b* may monitor for the paging message according to the one or more POs and the received WUS. In some cases, UE 115-*b* may monitor for the paging message according to an RRM measurement periodicity, or may monitor, according to a BCCH modification period, for the paging message, or an SIB, or an MIB, or a combination thereof.

Figure 8:
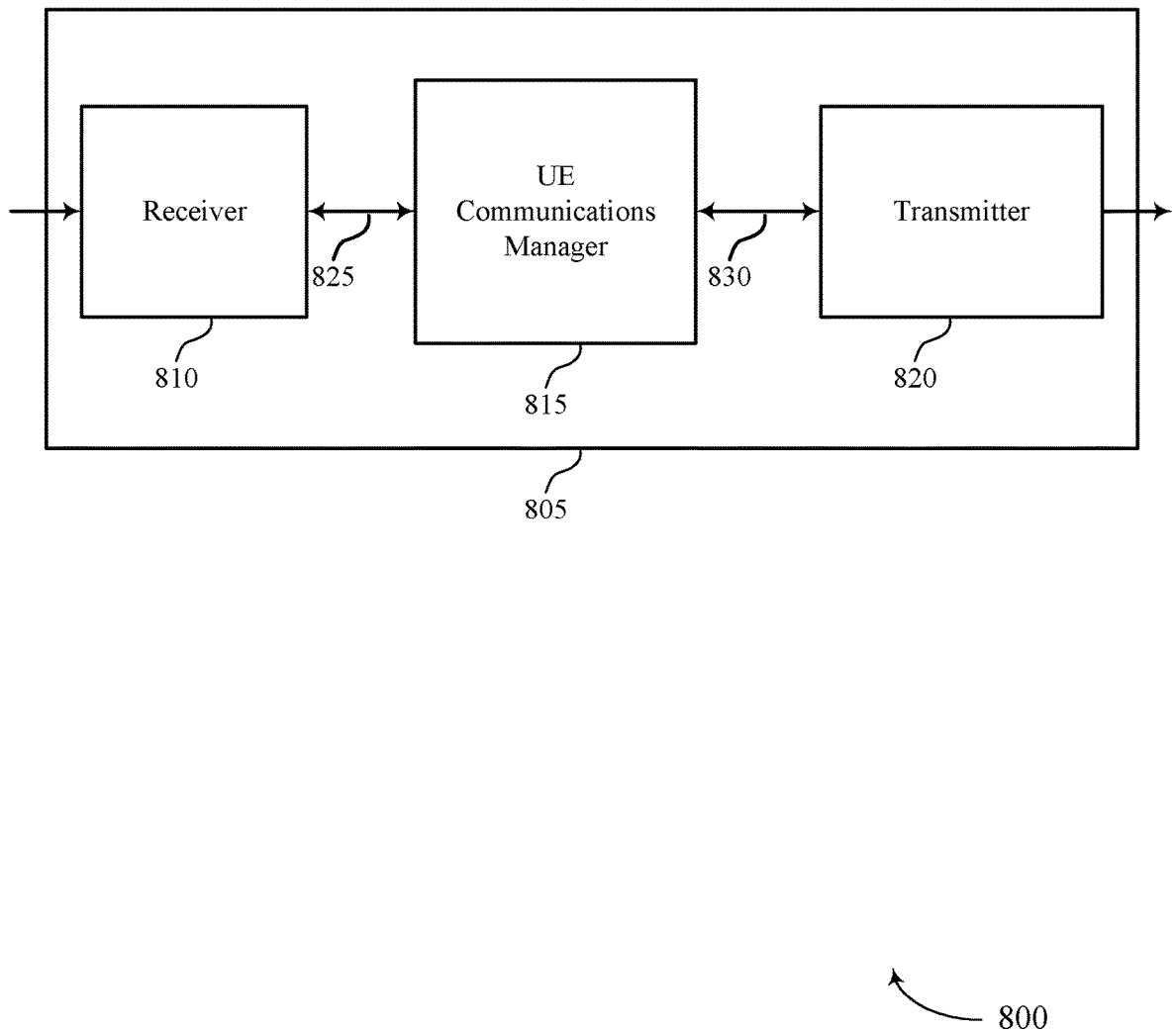
FIGS. 8 through 10 show block diagrams of a device that supports an RRM configuration for UEs with WUS receivers in accordance with aspects of the present disclosure.

FIG. 8 shows a block diagram 800 of a wireless device 805 that supports an RRM configuration for UEs with WUS receivers in accordance with aspects of the present disclosure. Wireless device 805 may be an example of aspects of a UE 115 as described herein. Wireless device 805 may include receiver 810, UE communications manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to fallback mode for WUS receivers, etc.). Information may be passed on to other components of the device via link 825. The receiver 810 may be an example of aspects of the transceiver 1135 described with reference to FIG. 11. The receiver 810 may utilize a single antenna or a set of antennas. In some cases, receiver 810 may receive a WUS based on a WUS periodicity.

UE communications manager 815 may be an example of aspects of the UE communications manager 1115 described with reference to FIG. 11. UE communications manager 815 and/or at least some of its various sub-components may be implemented in hardware, software executed by a processor, firmware, or any combination thereof. If implemented in software executed by a processor, the functions of the UE communications manager 815 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The UE communications manager 815 and/or at least some of its various sub-components may be physically located at various positions, including being distributed such that portions of functions are implemented at different physical locations by one or more physical devices. In some examples, UE communications manager 815 and/or at least some of its various sub-components may be a separate and distinct component in accordance with various aspects of the present disclosure. In other examples, UE communications manager 815 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 815 or receiver 810 may receive a configuration of a page monitoring periodicity, and receive a configuration of a WUS. In some cases, UE communications manager 815 may perform discontinuous monitoring for a set of WUSs based on a WUS periodicity, and monitor for a paging message during a page monitoring period according to the page monitoring periodicity, the WUS periodicity, and the received WUS.

In some examples, UE communications manager 815 may receive a configuration of a wake-up signal periodicity, perform discontinuous monitoring for a plurality of wake-up signals based at least in part on the wake-up signal periodicity, and perform an RRM measurement according to an RRM measurement periodicity, wherein the RRM measurement periodicity corresponds to one or more wake-up signal occasions according to the wake-up signal periodicity.

Transmitter 820 may transmit signals generated by other components of the device. In some cases, transmitter 820 may receive information from other components of the device via link 830. In some examples, the transmitter 820 may be collocated with a receiver 810 in a transceiver module. For example, the transmitter 820 may be an example of aspects of the transceiver 1135 described with reference to FIG. 11. The transmitter 820 may utilize a single antenna or a set of antennas.

Figure 9:
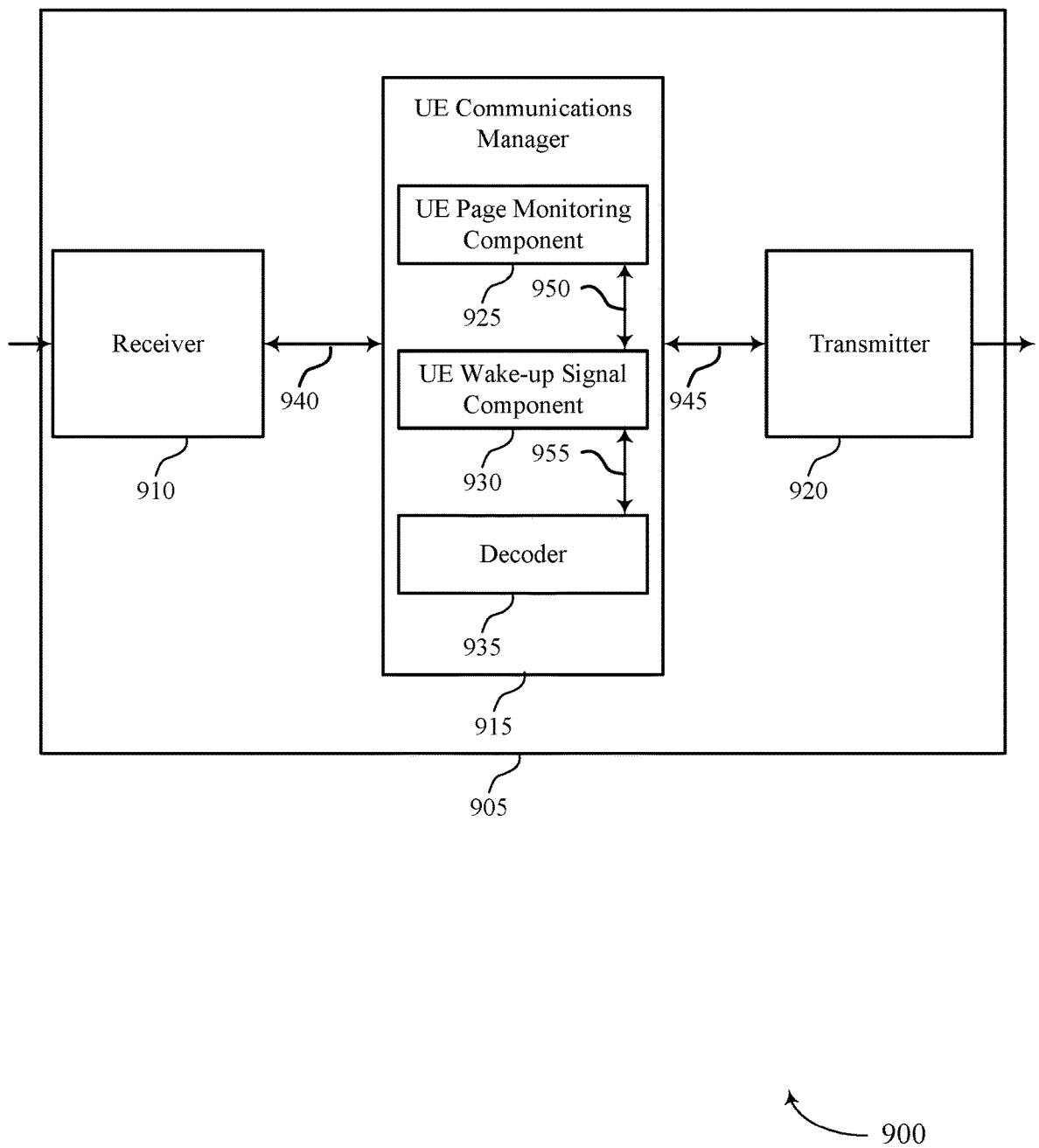

FIG. 9 shows a block diagram 900 of a wireless device 905 that supports an RRM configuration for UEs with WUS receivers in accordance with aspects of the present disclosure. Wireless device 905 may be an example of aspects of a wireless device 805 or a UE 115 as described with reference to FIG. 8. Wireless device 905 may include receiver 910, UE communications manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to fallback mode for WUS receivers, etc.). Information may be passed on to other components of the device via link 940. The receiver 910 may be an example of aspects of the transceiver 1135 described with reference to FIG. 11. The receiver 910 may utilize a single antenna or a set of antennas.

UE communications manager 915 may be an example of aspects of the UE communications manager 1115 described with reference to FIG. 11. UE communications manager 915 may also include UE page monitoring component 925, UE wake-up signal component 930, and decoder 935.

UE page monitoring component 925 may receive a configuration of a page monitoring periodicity, identify a system information change notification based on a detected paging message, and determine that the page monitoring periodicity includes one or more POs based on the configuration. In some cases, the WUS periodicity may correspond to the one or more Pos. In some examples, UE page monitoring component 925 may monitor for the paging message according to a PO periodicity and the received WUS. In some cases, UE page monitoring component 925 may monitor for the paging message according to the PTW periodicity and the received WUS and/or monitor for the paging message according to an RRM measurement periodicity. Additionally or alternatively, UE page monitoring component 925 may monitor for the paging message during a page monitoring period according to the page monitoring periodicity, the WUS periodicity, and the received WUS. In some cases, UE page monitoring component 925 may identify the configuration of the page monitoring periodicity based on a time period during which the WUS has been skipped at least once.

Further, UE page monitoring component 925 may identify the configuration of the page monitoring periodicity based on a relationship between the page monitoring periodicity and one or more other parameters, and detect the paging message during the page monitoring period based on the monitoring, where the paging message is detected based on the received WUS. In some cases, UE page monitoring component 925 may monitor, according to a BCCH modification period, for the paging message, a system information block, a MIB, or a combination thereof. In some cases, receiving the configuration of the page monitoring periodicity includes: receiving the configuration of the page monitoring periodicity via a system information message, an RRC message, a NAS message, or a combination thereof. In some cases, UE page monitoring component 925 may be in communication with various components of UE communications manager 915 via link 950.

UE wake-up signal component 930 may receive a configuration of a WUS, perform discontinuous monitoring for a set of WUSs based on a WUS periodicity, determine that the page monitoring periodicity includes one or more WUS occasions based on the configuration, where the WUS periodicity corresponds to a PTW periodicity that includes one or more POs, and determine that the page monitoring periodicity includes one or more WUS occasions based on the configuration, where the WUS periodicity corresponds to one or more POs. In some cases, UE wake-up signal component 930 may further determine whether the WUS is detected at the one or more WUS occasions.

The decoder 935 may decode information such as packets, user data, or control information associated with various information channels (e.g., control channels, data channels, and information related to fallback mode for WUS receivers, etc.) received by the various components of wireless device 905. In some cases, decoder 935 may receive the information from various components of the device via link 955.

Transmitter 920 may transmit signals generated by other components of the device, and received via link 945. In some examples, the transmitter 920 may be collocated with a receiver 910 in a transceiver module. For example, the transmitter 920 may be an example of aspects of the transceiver 1135 described with reference to FIG. 11. The transmitter 920 may utilize a single antenna or a set of antennas.

Figure 10:
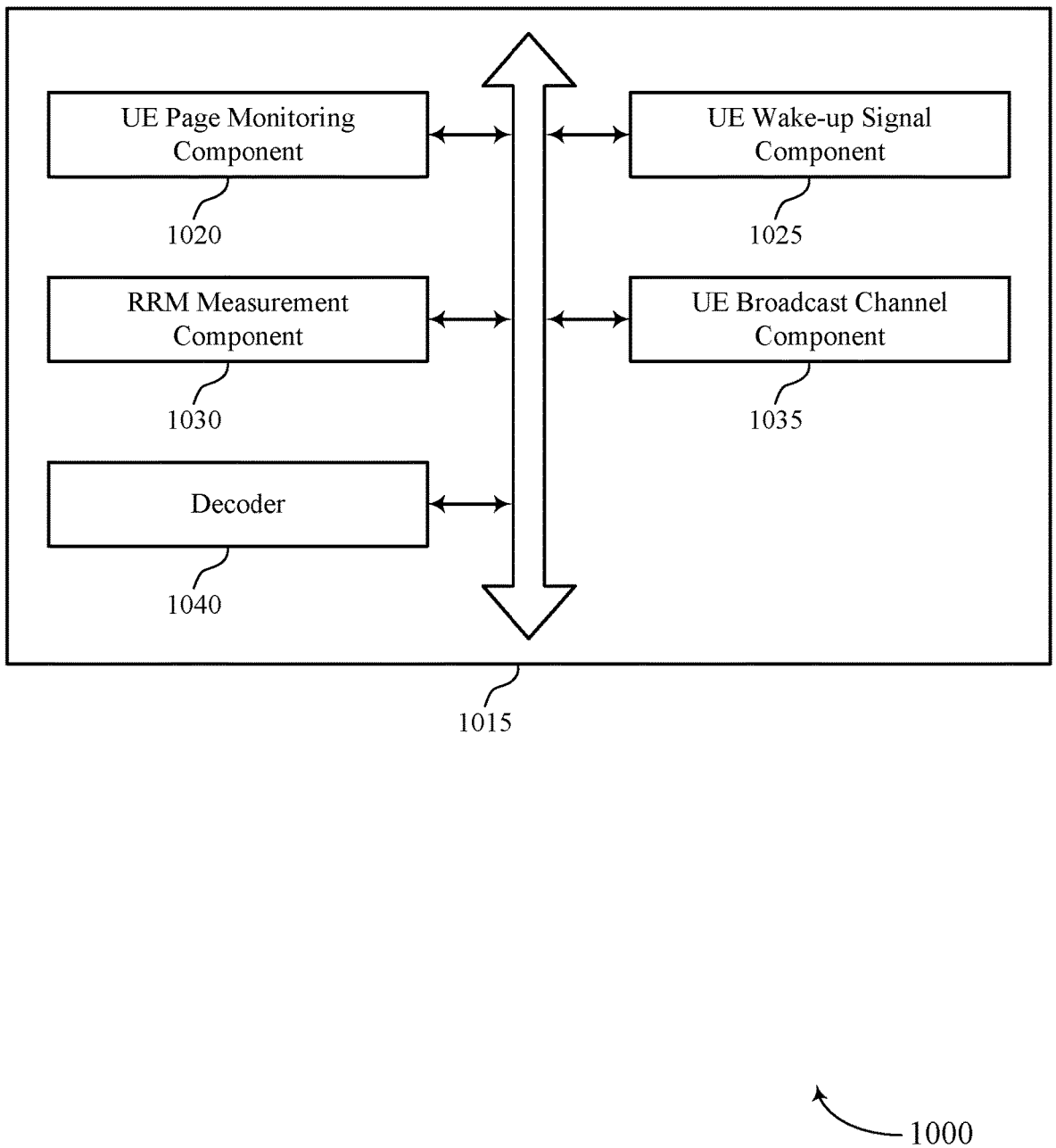

FIG. 10 shows a block diagram 1000 of a UE communications manager 1015 that supports an RRM configuration for UEs with WUS receivers in accordance with aspects of the present disclosure. The UE communications manager 1015 may be an example of aspects of a UE communications manager 815, a UE communications manager 915, or a UE communications manager 1115 described with reference to FIGS. 8, 9, and 11. The UE communications manager 1015 may include UE page monitoring component 1020, UE wake-up signal component 1025, RRM measurement component 1030, UE broadcast channel component 1035, and decoder 1040. Each of these modules may communicate, directly or indirectly, with one another (e.g., via one or more buses).

UE page monitoring component 1020 may receive a configuration of a page monitoring periodicity, identify a system information change notification based on a detected paging message, and determine that the page monitoring periodicity includes one or more POs based on the configuration, where the WUS periodicity corresponds to the one or more Pos. In some examples, UE page monitoring component 1020 may monitor for the paging message according to a PO periodicity and the received WUS. In some cases, UE page monitoring component 1020 may further monitor for the paging message according to the PTW periodicity and the received WUS, monitor for the paging message according to an RRM measurement periodicity, and monitor for a paging message during a page monitoring period according to the page monitoring periodicity, the WUS periodicity, and the received WUS. In some cases, UE page monitoring component 1020 may identify the configuration of the page monitoring periodicity based on a time period during which the WUS has been skipped at least once.

In some cases, UE page monitoring component 1020 may identify the configuration of the page monitoring periodicity based on a relationship between the page monitoring periodicity and one or more other parameters, detect the paging message during the page monitoring period based on the monitoring, where the paging message is detected based on the received WUS, and monitor, according to a BCCH modification period, for the paging message, or a system information block, or a MIB, or a combination thereof. In some cases, receiving the configuration of the page monitoring periodicity includes receiving the configuration of the page monitoring periodicity via a system information message, or a RRC message, or a NAS message, or a combination thereof. UE page monitoring component 1020 may monitor for the paging message according to the one or more POs and the received WUS.

UE wake-up signal component 1025 may receive a configuration of a WUS and perform discontinuous monitoring for a set of WUSs based on a WUS periodicity. In some examples, UE wake-up signal component 1025 may determine that the page monitoring periodicity includes one or more WUS occasions based on the configuration, where the WUS periodicity corresponds to a PTW periodicity that includes one or more POs, and determine that the page monitoring periodicity includes one or more WUS occasions based on the configuration. In some cases, the WUS periodicity corresponds to one or more POs. In some cases, UE wake-up signal component 1025 may determine whether the WUS is detected at the one or more WUS occasions.

RRM measurement component 1030 may determine that the page monitoring periodicity includes one or more RRM measurement periods based on the configuration, perform a RRM measurement according to the WUS periodicity, where an RRM measurement periodicity includes one or more WUS occasions, determine, based on the RRM measurement, a RSRP, a RSRQ, a confirmation of a serving cell, or a combination thereof. In some cases, RRM measurement component 1030 may perform the RRM measurement based on a determination that at least one WUS is detected at the one or more WUS occasions, perform the RRM measurement at a temporally last WUS occasion based on a determination that no WUSs were detected at the one or more WUS occasions, and perform a RRM measurement according to the page monitoring periodicity.

UE broadcast channel component 1035 may determine that the page monitoring periodicity includes one or more BCCH modification periods based on the configuration. Decoder 1040 may decode information such as packets, user data, or control information associated with various information channels (e.g., control channels, data channels, and information related to fallback mode for WUS receivers, etc.) obtained by the various components of UE communications manager 1015, or wireless device hosting the UE communications manager.

Figure 11:
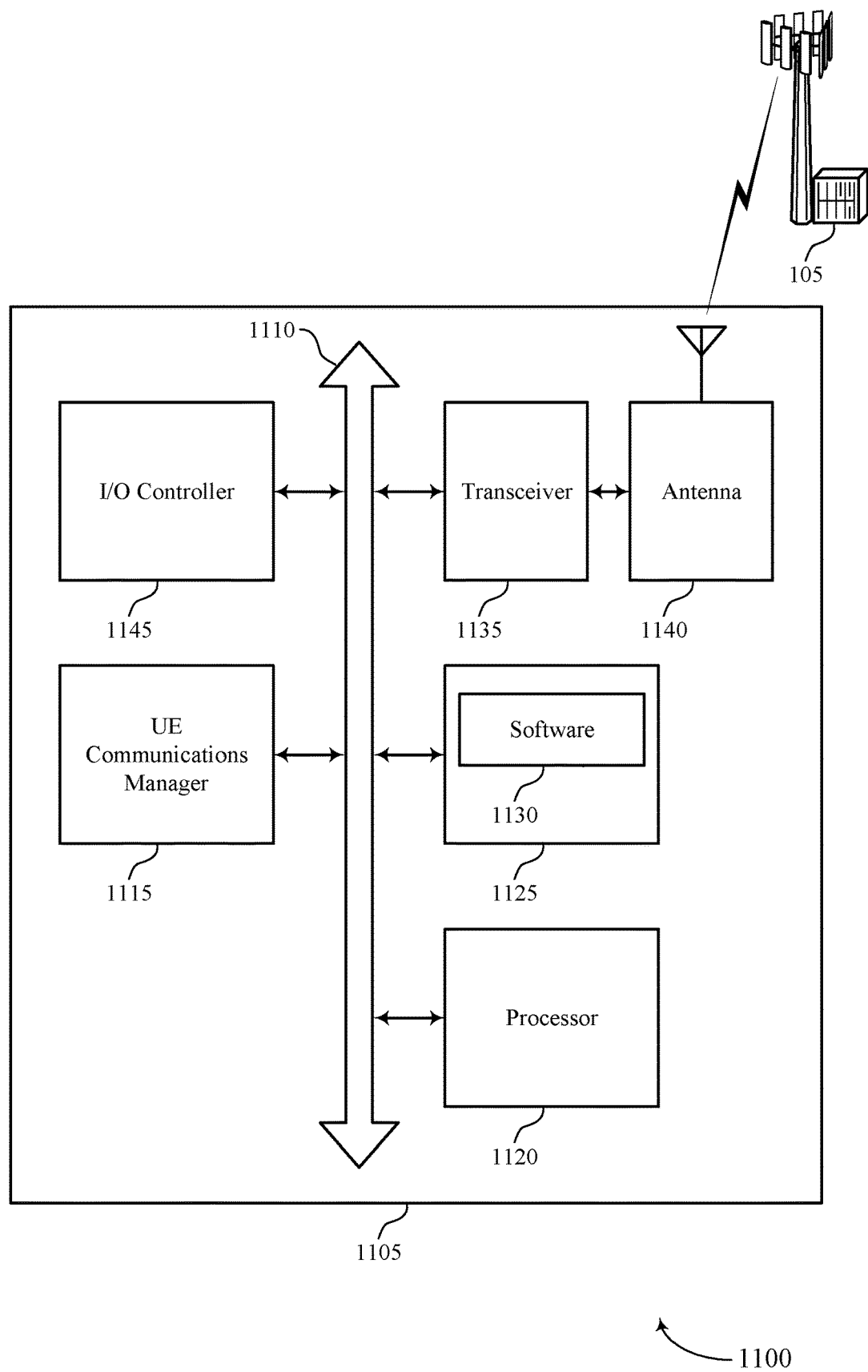
FIG. 11 illustrates a block diagram of a system including a UE that supports an RRM configuration for UEs with WUS receivers in accordance with aspects of the present disclosure.

FIG. 11 shows a diagram of a system 1100 including a device 1105 that supports an RRM configuration for UEs with WUS receivers in accordance with aspects of the present disclosure. Device 1105 may be an example of or include the components of wireless device 805, wireless device 905, or a UE 115 as described herein, e.g., with reference to FIGS. 8 and 9. Device 1105 may include components for bi-directional voice and data communications including components for transmitting and receiving communications, including UE communications manager 1115, processor 1120, memory 1125, software 1130, transceiver 1135, antenna 1140, and I/O controller 1145. These components may be in electronic communication via one or more buses (e.g., bus 1110). Device 1105 may communicate wirelessly with one or more base stations 105.

Processor 1120 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1120 may be configured to operate a memory array using a memory controller. In other cases, a memory controller may be integrated into processor 1120. Processor 1120 may be configured to execute computer-readable instructions stored in a memory to perform various functions (e.g., functions or tasks supporting fallback mode for WUS receivers).

Memory 1125 may include random-access memory (RAM) and read-only memory (ROM). The memory 1125 may store computer-readable, computer-executable software 1130 including instructions that, when executed, cause the processor to perform various functions described herein. In some cases, the memory 1125 may contain, among other things, a basic input/output system (BIOS) which may control basic hardware or software operation such as the interaction with peripheral components or devices.

Software 1130 may include code to implement aspects of the present disclosure, including code to support fallback mode for WUS receivers. Software 1130 may be stored in a non-transitory computer-readable medium such as system memory or other memory. In some cases, the software 1130 may not be directly executable by the processor but may cause a computer (e.g., when compiled and executed) to perform functions described herein.

Transceiver 1135 may communicate bi-directionally, via one or more antennas, wired, or wireless links as described herein. For example, the transceiver 1135 may represent a wireless transceiver and may communicate bi-directionally with another wireless transceiver. The transceiver 1135 may also include a modem to modulate the packets and provide the modulated packets to the antennas for transmission, and to demodulate packets received from the antennas. In some cases, the wireless device may include a single antenna 1140. However, in some cases the device may have more than one antenna 1140, which may be capable of concurrently transmitting or receiving multiple wireless transmissions.

I/O controller 1145 may manage input and output signals for device 1105. I/O controller 1145 may also manage peripherals not integrated into device 1105. In some cases, I/O controller 1145 may represent a physical connection or port to an external peripheral. In some cases, I/O controller 1145 may utilize an operating system such as iOS®, ANDROID®, MS-DOS®, MS-WINDOWS®, OS/2®, UNIX®, LINUX®, or another known operating system. In other cases, I/Ocontroller 1145 may represent or interact with a modem, a keyboard, a mouse, a touchscreen, or a similar device. In some cases, I/O controller 1145 may be implemented as part of a processor. In some cases, a user may interact with device 1105 via I/O controller 1145 or via hardware components controlled by I/O controller 1145.

Figure 12:
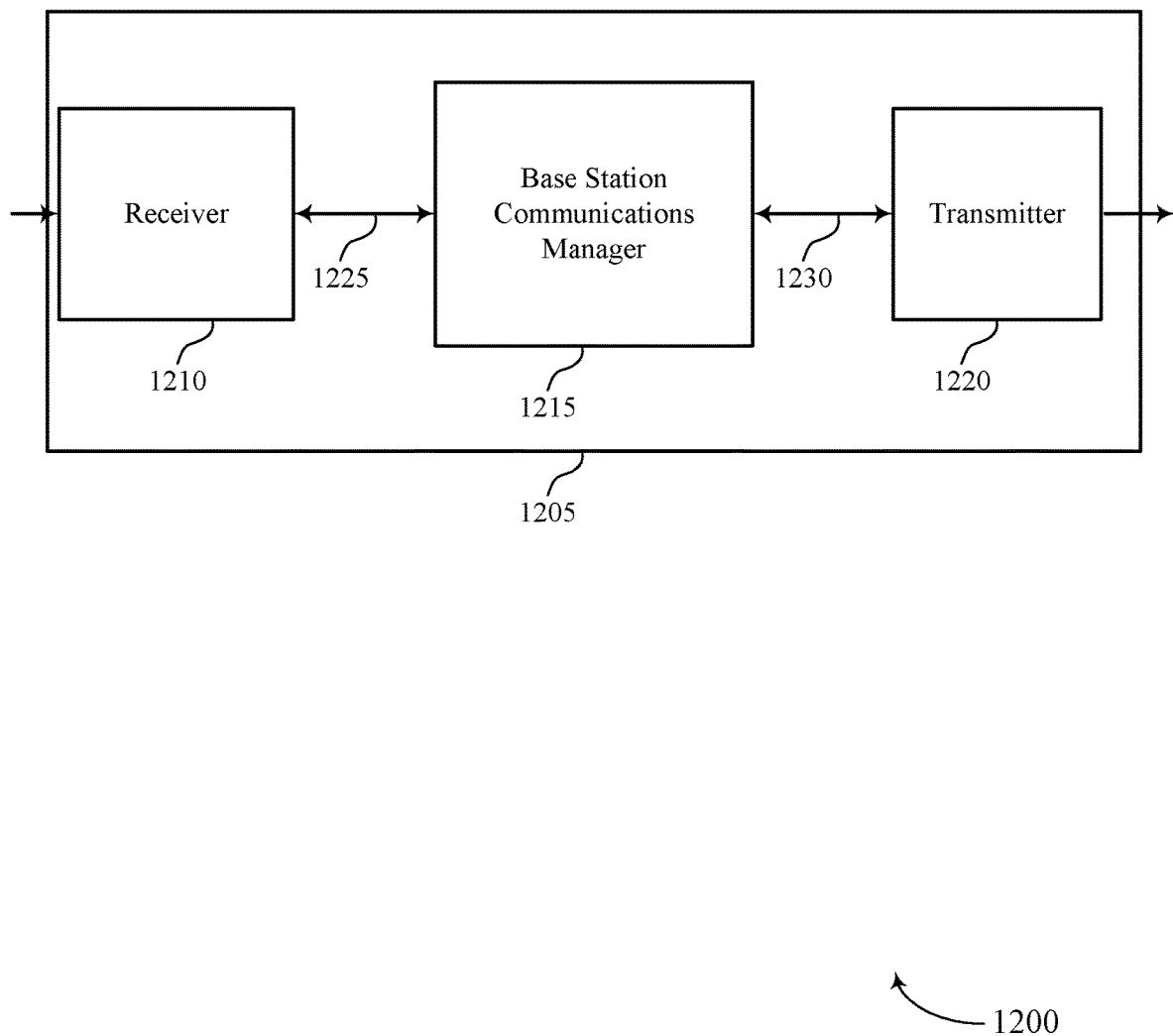
FIGS. 12 through 14 show block diagrams of a device that supports an RRM configuration for UEs with WUS receivers in accordance with aspects of the present disclosure.

FIG. 12 shows a block diagram 1200 of a wireless device 1205 that supports an RRM configuration for UEs with WUS receivers in accordance with aspects of the present disclosure. Wireless device 1205 may be an example of aspects of a base station 105 as described herein. Wireless device 1205 may include receiver 1210, base station communications manager 1215, and transmitter 1220. Wireless device 1205 may also include a processor. Each of these components may be in communication with one another (e.g., via one or more buses).

Receiver 1210 may receive information such as packets, user data, or control information associated with various information channels (e.g., control channels, data channels, and information related to fallback mode for WUS receivers, etc.). Information may be passed on to other components of the device via link 1225. The receiver 1210 may be an example of aspects of the transceiver 1535 described with reference to FIG. 15. The receiver 1210 may utilize a single antenna or a set of antennas.

Base station communications manager 1215 may be an example of aspects of the base station communications manager 1515 described with reference to FIG. 15. Base station communications manager 1215 and/or at least some of its various sub-components may be implemented in hardware, software executed by a processor, firmware, or any combination thereof. If implemented in software executed by a processor, the functions of the base station communications manager 1215 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station communications manager 1215 and/or at least some of its various sub-components may be physically located at various positions, including being distributed such that portions of functions are implemented at different physical locations by one or more physical devices. In some examples, base station communications manager 1215 and/or at least some of its various sub-components may be a separate and distinct component in accordance with various aspects of the present disclosure. In some cases, base station communications manager 1215 may pass on information to transmitter 1220 via link 1230, and may receiver information from receiver 1210 via link 1225. In other examples, base station communications manager 1215 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 1215 may determine a page monitoring periodicity for configuring a UE 115 to monitor for a paging message and determine a WUS periodicity for a set of WUSs, the WUS periodicity being less than or equal to the page monitoring periodicity.

In some examples, base station communications manager 1215 may determine a wake-up signal periodicity for a plurality of wake-up signals, configure, based on the wake-up signal periodicity, an RRM measurement periodicity for a UE to perform an RRM measurement, wherein the RRM measurement periodicity corresponds to one or more wake-up signal occasions according to the wake-up signal periodicity, and transmit a configuration indicating the RRM measurement periodicity to the UE.

Transmitter 1220 may transmit signals generated by other components of the device, and received via link 1230. In some examples, the transmitter 1220 may be collocated with a receiver 1210 in a transceiver module. For example, the transmitter 1220 may be an example of aspects of the transceiver 1535 described with reference to FIG. 15. The transmitter 1220 may utilize a single antenna or a set of antennas.

Transmitter 1220 may transmit a configuration of the page monitoring periodicity to the UE, where the configuration indicates a relationship between the page monitoring periodicity and the WUS periodicity.

Figure 13:
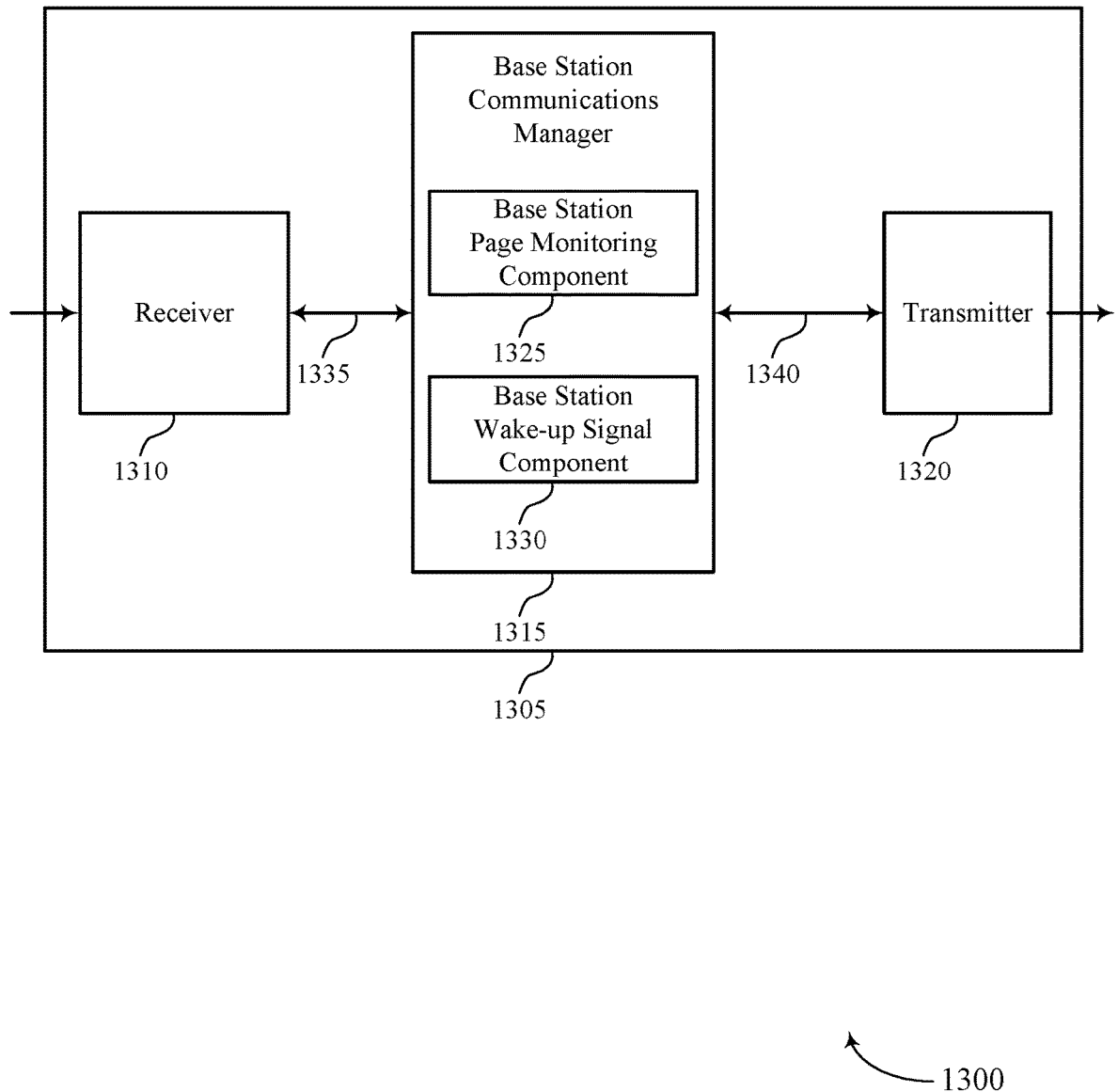

FIG. 13 shows a block diagram 1300 of a wireless device 1305 that supports an RRM configuration for UEs with WUS receivers in accordance with aspects of the present disclosure. Wireless device 1305 may be an example of aspects of a wireless device 1205 or a base station 105 as described with reference to FIG. 12. Wireless device 1305 may include receiver 1310, base station communications manager 1315, and transmitter 1320. Wireless device 1305 may also include a processor. Each of these components may be in communication with one another (e.g., via one or more buses).

Receiver 1310 may receive information such as packets, user data, or control information associated with various information channels (e.g., control channels, data channels, and information related to fallback mode for WUS receivers, etc.). Information may be passed on to other components of the device via link 1335. The receiver 1310 may be an example of aspects of the transceiver 1535 described with reference to FIG. 15. The receiver 1310 may utilize a single antenna or a set of antennas.

Base station communications manager 1315 may be an example of aspects of the base station communications manager 1515 described with reference to FIG. 15. Base station communications manager 1315 may also include base station page monitoring component 1325 and base station wake-up signal component 1330.

Base station page monitoring component 1325 may determine a page monitoring periodicity for configuring a UE 115 to monitor for a paging message and transmit, within the configuration, an indication that the page monitoring periodicity includes one or more POs, where the WUS periodicity corresponds to the one or more POs. In some cases, transmitting the configuration of the page monitoring periodicity includes transmitting the configuration of the page monitoring periodicity via a system information message, or an RRC message, or a NAS message, or a combination thereof.

Base station wake-up signal component 1330 may determine a WUS periodicity for a set of WUSs, the WUS periodicity being less than or equal to the page monitoring periodicity, transmit, within the configuration, an indication that the page monitoring periodicity includes one or more WUS occasions, where the WUS periodicity corresponds to a PTW periodicity that includes one or more POs, and transmit, within the configuration, an indication that the page monitoring periodicity includes one or more WUS occasions based on the configuration, where the WUS periodicity corresponds to one or more POs.

Transmitter 1320 may transmit signals generated by other components of the device, and received via link 1340. In some examples, the transmitter 1320 may be collocated with a receiver 1310 in a transceiver module. For example, the transmitter 1320 may be an example of aspects of the transceiver 1535 described with reference to FIG. 15. The transmitter 1320 may utilize a single antenna or a set of antennas.

Figure 14:
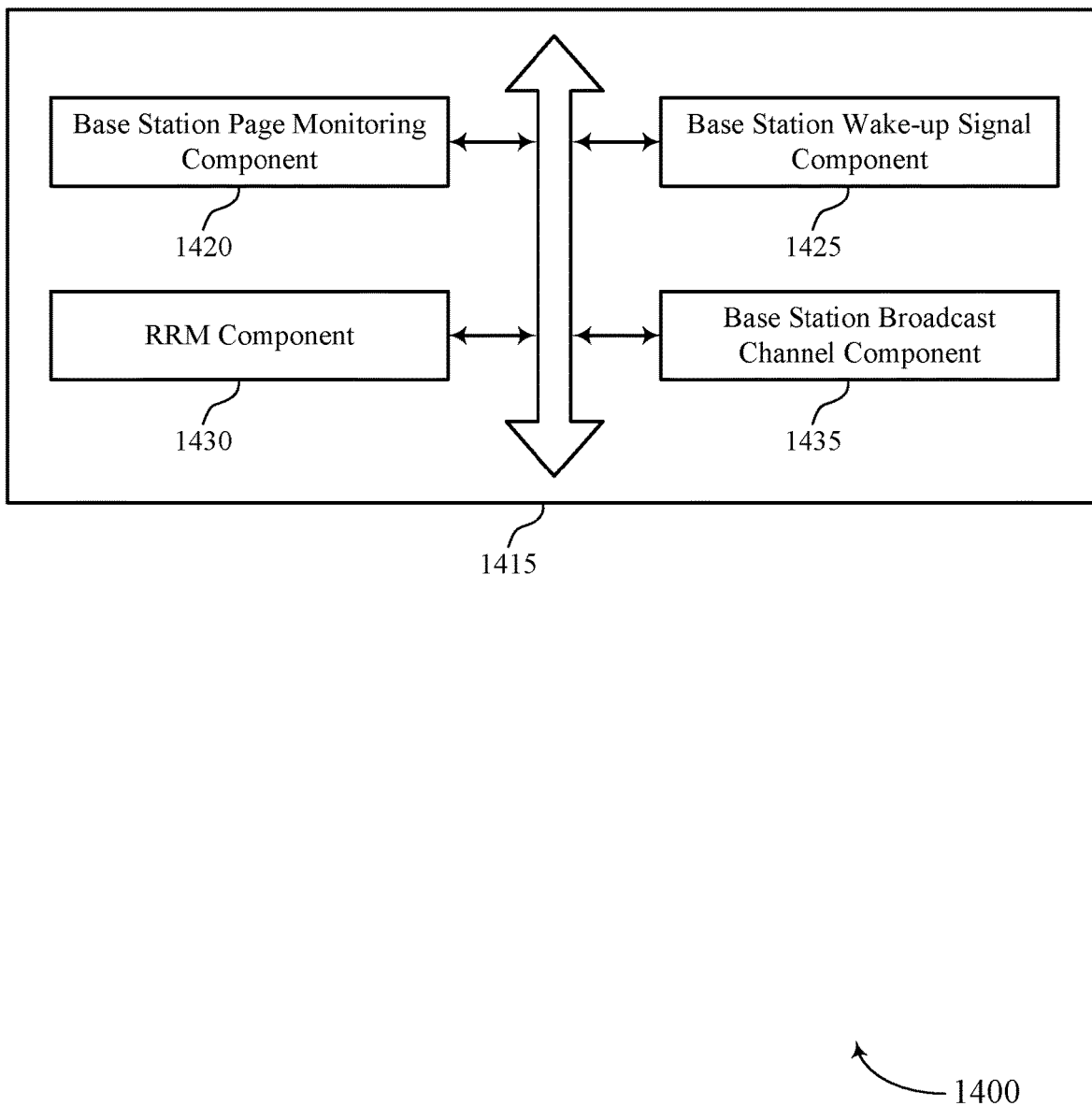

FIG. 14 shows a block diagram 1400 of a base station communications manager 1415 that supports an RRM configuration for UEs with WUS receivers in accordance with aspects of the present disclosure. The base station communications manager 1415 may be an example of aspects of a base station communications manager 1515 described with reference to FIGS. 12, 13, and 15. The base station communications manager 1415 may include base station page monitoring component 1420, base station wake-up signal component 1425, RRM component 1430, and base station broadcast channel component 1435. Each of these modules may communicate, directly or indirectly, with one another (e.g., via one or more buses).

Base station page monitoring component 1420 may determine a page monitoring periodicity for configuring a UE 115 to monitor for a paging message and transmit, within the configuration, an indication that the page monitoring periodicity includes one or more POs, where the WUS periodicity corresponds to the one or more POs. In some cases, transmitting the configuration of the page monitoring periodicity includes transmitting the configuration of the page monitoring periodicity via a system information message, or an RRC message, or a NAS message, or a combination thereof.

Base station wake-up signal component 1425 may determine a WUS periodicity for a set of WUSs, the WUS periodicity being less than or equal to the page monitoring periodicity. In some cases, base station wake-up signal component 1425 may transmit, within the configuration, an indication that the page monitoring periodicity includes one or more WUS occasions, where the WUS periodicity corresponds to a PTW periodicity that includes one or more Pos. Additionally or alternatively, base station wake-up signal component 1425 may transmit, within the configuration, an indication that the page monitoring periodicity includes one or more WUS occasions based on the configuration, where the WUS periodicity corresponds to one or more POs.

RRM component 1430 may transmit, within the configuration, an indication that the page monitoring periodicity includes one or more RRM measurement periods. Base station broadcast channel component 1435 may transmit, within the configuration, an indication that the page monitoring periodicity includes one or more BCCH modification periods and transmit a system information change notification within the paging message.

Figure 15:
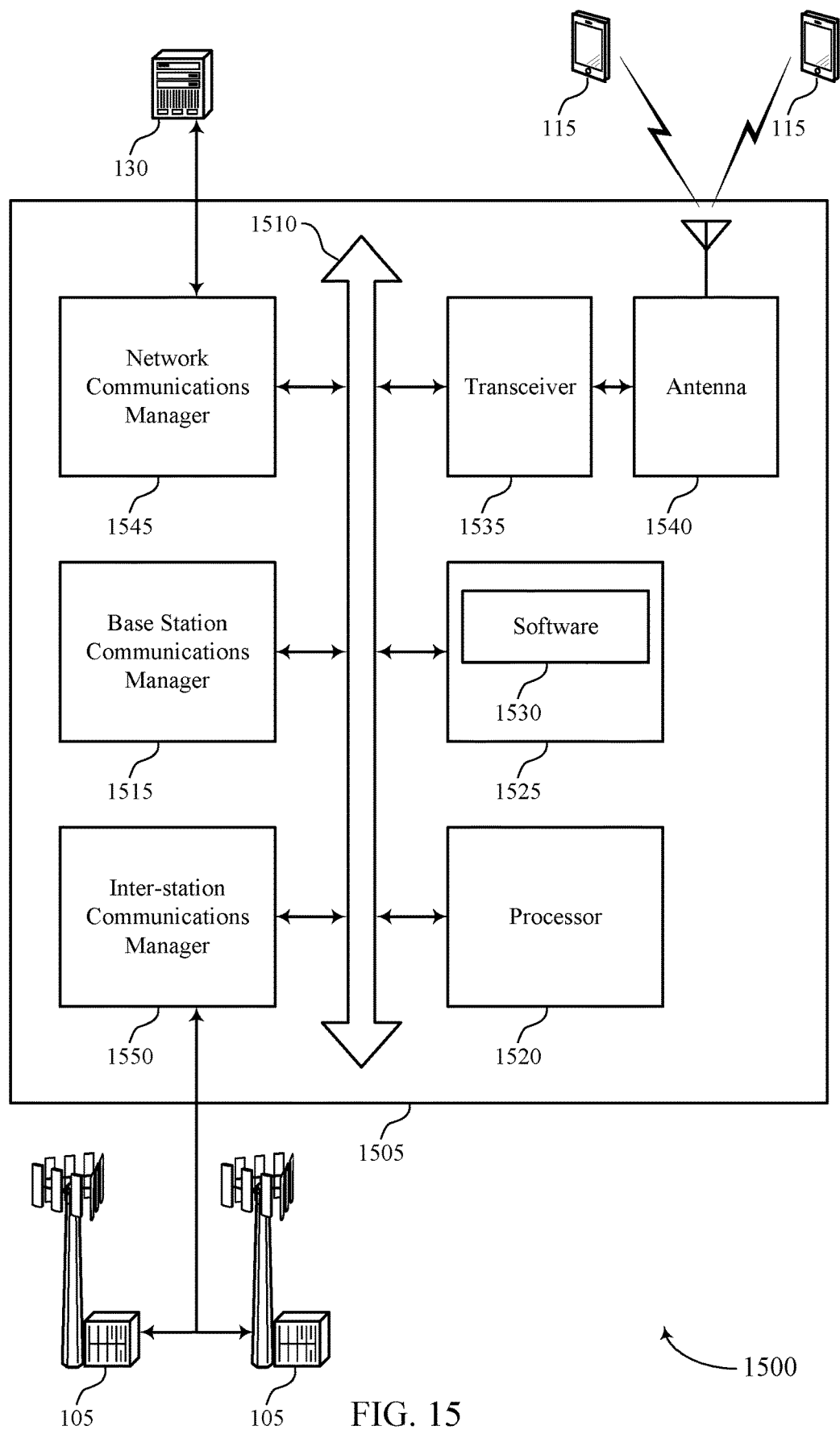
FIG. 15 illustrates a block diagram of a system including a base station that supports an RRM configuration for UEs with WUS receivers in accordance with aspects of the present disclosure.

FIG. 15 shows a diagram of a system 1500 including a device 1505 that supports an RRM configuration for UEs with WUS receivers in accordance with aspects of the present disclosure. Device 1505 may be an example of or include the components of base station 105 as described herein, e.g., with reference to FIG. 1. Device 1505 may include components for bi-directional voice and data communications including components for transmitting and receiving communications, including base station communications manager 1515, processor 1520, memory 1525, software 1530, transceiver 1535, antenna 1540, network communications manager 1545, and inter-station communications manager 1550. These components may be in electronic communication via one or more buses (e.g., bus 1510). Device 1505 may communicate wirelessly with one or more UEs 115.

Processor 1520 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1520 may be configured to operate a memory array using a memory controller. In other cases, a memory controller may be integrated into processor 1520. Processor 1520 may be configured to execute computer-readable instructions stored in a memory to perform various functions (e.g., functions or tasks supporting fallback mode for WUS receivers).

Memory 1525 may include RAM and ROM. The memory 1525 may store computer-readable, computer-executable software 1530 including instructions that, when executed, cause the processor to perform various functions described herein. In some cases, the memory 1525 may contain, among other things, a BIOS which may control basic hardware or software operation such as the interaction with peripheral components or devices.

Software 1530 may include code to implement aspects of the present disclosure, including code to support fallback mode for WUS receivers. Software 1530 may be stored in a non-transitory computer-readable medium such as system memory or other memory. In some cases, the software 1530 may not be directly executable by the processor but may cause a computer (e.g., when compiled and executed) to perform functions described herein.

Transceiver 1535 may communicate bi-directionally, via one or more antennas, wired, or wireless links as described herein. For example, the transceiver 1535 may represent a wireless transceiver and may communicate bi-directionally with another wireless transceiver. The transceiver 1535 may also include a modem to modulate the packets and provide the modulated packets to the antennas for transmission, and to demodulate packets received from the antennas. In some cases, the wireless device may include a single antenna 1540. However, in some cases the device may have more than one antenna 1540, which may be capable of concurrently transmitting or receiving multiple wireless transmissions.

Network communications manager 1545 may manage communications with the core network (e.g., via one or more wired backhaul links). For example, the network communications manager 1545 may manage the transfer of data communications for client devices, such as one or more UEs 115.

Inter-station communications manager 1550 may manage communications with other base station 105, and may include a controller or scheduler for controlling communications with UEs 115 in cooperation with other base stations 105. For example, the inter-station communications manager 1550 may coordinate scheduling for transmissions to UEs 115 for various interference mitigation techniques such as beamforming or joint transmission. In some examples, inter-station communications manager 1550 may provide an X2 interface within an LTE/LTE-A wireless communication network technology to provide communication between base stations 105.

Figure 16:
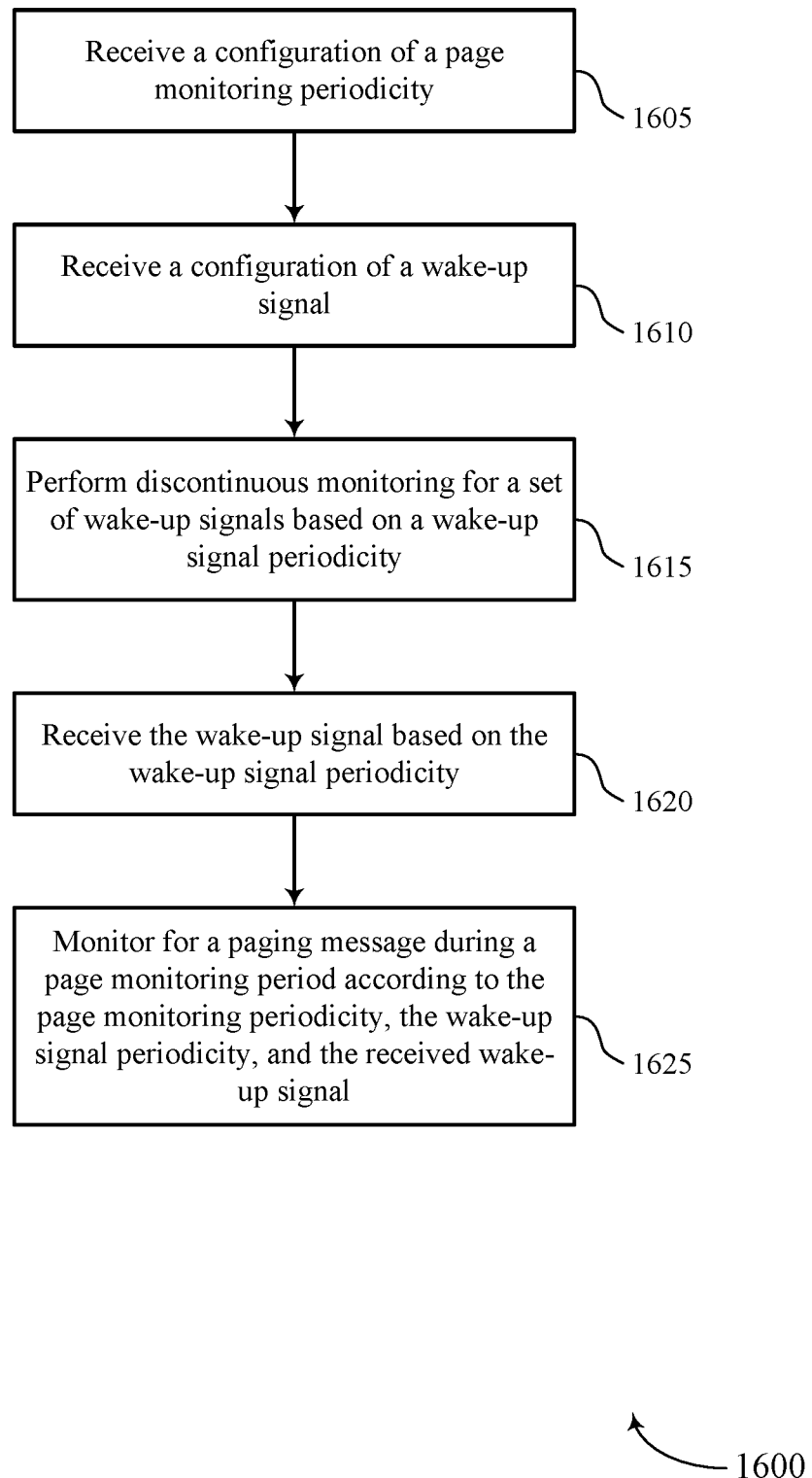
FIGS. 16 through 22 illustrate methods for an RRM configuration for UEs with WUS receivers in accordance with aspects of the present disclosure.

FIG. 16 shows a flowchart illustrating a method 1600 for fallback mode for WUS receivers in accordance with aspects of the present disclosure. The operations of method 1600 may be implemented by a UE 115 or its components as described herein. For example, the operations of method 1600 may be performed by a UE communications manager as described with reference to FIGS. 8 through 11. In some examples, a UE 115 may execute a set of codes to control the functional elements of the device to perform the functions described herein. Additionally or alternatively, the UE 115 may perform aspects of the functions described herein using special-purpose hardware.

Method 1600 may begin when a UE 115 is in idle mode (e.g., an RRC IDLE state). At 1605 the UE 115 may receive a configuration of a page monitoring periodicity. The operations of 1605 may be performed according to the methods described herein. In certain examples, aspects of the operations of 1605 may be performed by a UE page monitoring component as described with reference to FIGS. 8 through 11. In some cases, receiving the configuration of the page monitoring periodicity may include identifying time and frequency resources over which the configuration is received, demodulating the transmission over the identified time-frequency resources, and decoding the demodulated transmission using a decoder, to obtain one or more bits pertaining to the configuration.

At 1610 the UE 115 may receive a configuration of a WUS. The operations of 1610 may be performed according to the methods described herein. In certain examples, aspects of the operations of 1610 may be performed by a UE wake-up signal component as described with reference to FIGS. 8 through 11. In some cases, receiving the WUS may involve identifying time and frequency resources over which the configuration is received, demodulating the transmission over the identified time-frequency resources, and decoding the demodulated transmission using the decoder, to obtain one or more bits pertaining to the configuration.

At 1615 the UE 115 may perform discontinuous monitoring for a plurality of WUSs based at least in part on a WUS periodicity. For example, the WUS periodicity may be determined based on the WUS configuration received at 1610. In some cases, the UE 115 may perform a decoding procedure to determine the WUS periodicity, and may control one or more functional elements (e.g., receiver, or wake-up signal component) to monitor the WUSs. The operations of 1615 may be performed according to the methods described herein. In certain examples, aspects of the operations of 1615 may be performed by a UE wake-up signal component as described with reference to FIGS. 8 through 11.

At 1620 the UE 115 may receive the WUS based at least in part on the WUS periodicity. In some cases, the UE 115 may control one or more of its functional elements to activate or synchronize prior to the instance when the WUS is received, wherein the decision is based in part on a WUS periodicity determined by the UE 115, or indicated by the network. The operations of 1620 may be performed according to the methods described herein. In certain examples, aspects of the operations of 1620 may be performed by a receiver as described with reference to FIGS. 8 through 11.

At 1625 the UE 115 may monitor for a paging message during a page monitoring period according to the page monitoring periodicity, the WUS periodicity, and the received WUS. Further, the UE 115 may monitor for paging messages to receive system information updates based on one or more techniques described with reference to FIGS. 2-6. For instance, the UE 115 may decide which of the techniques to use (e.g., checking MIB, SIB, or the one or more deployment schemes for page monitoring periodicity without WUS) to receive system information updates. The operations of 1625 may be performed according to the methods described herein. In certain examples, aspects of the operations of 1625 may be performed by a UE page monitoring component as described with reference to FIGS. 8 through 11.

Figure 17:
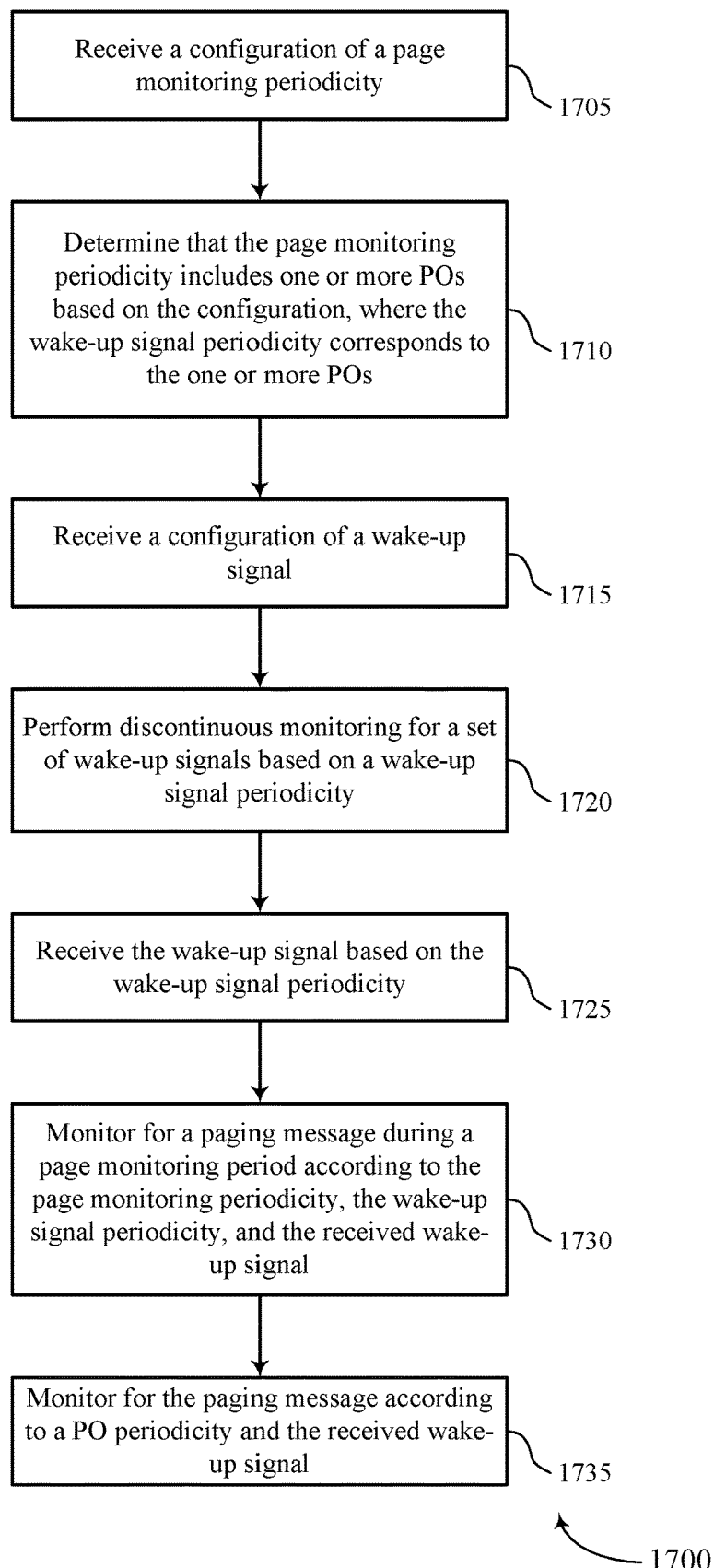

FIG. 17 shows a flowchart illustrating a method 1700 for fallback mode for WUS receivers in accordance with aspects of the present disclosure. The operations of method 1700 may be implemented by a UE 115 or its components as described herein. For example, the operations of method 1700 may be performed by a UE communications manager as described with reference to FIGS. 8 through 11. In some examples, a UE 115 may execute a set of codes to control the functional elements of the device to perform the functions described herein. Additionally or alternatively, the UE 115 may perform aspects of the functions described herein using special-purpose hardware.

At 1705 the UE 115 may receive a configuration of a page monitoring periodicity. The operations of 1705 may be performed according to the methods described herein. In certain examples, aspects of the operations of 1705 may be performed by a UE page monitoring component as described with reference to FIGS. 8 through 11.

At 1710 the UE 115 may determine that the page monitoring periodicity comprises one or more POs based on the configuration, wherein the WUS periodicity corresponds to the one or more POs. For example, the UE 115 may identify the decoded one or more bits corresponding to the configuration, and may determine the page monitoring periodicity from the decoded one or more bits. The operations of 1710 may be performed according to the methods described herein. In certain examples, aspects of the operations of 1710 may be performed by a UE page monitoring component as described with reference to FIGS. 8 through 11.

At 1715 the UE 115 may receive a configuration of a WUS. The operations of 1715 may be performed according to the methods described herein. In certain examples, aspects of the operations of 1715 may be performed by a UE wake-up signal component as described with reference to FIGS. 8 through 11.

At 1720 the UE 115 may perform discontinuous monitoring for a plurality of WUSs based at least in part on a WUS periodicity. The operations of 1720 may be performed according to the methods described herein. In certain examples, aspects of the operations of 1720 may be performed by a UE wake-up signal component as described with reference to FIGS. 8 through 11.

At 1725 the UE 115 may receive the WUS based at least in part on the WUS periodicity. The operations of 1725 may be performed according to the methods described herein. In certain examples, aspects of the operations of 1725 may be performed by a receiver as described with reference to FIGS. 8 through 11.

At 1730 the UE 115 may monitor for a paging message during a page monitoring period according to the page monitoring periodicity, the WUS periodicity, and the received WUS. The operations of 1730 may be performed according to the methods described herein. In certain examples, aspects of the operations of 1730 may be performed by a UE page monitoring component as described with reference to FIGS. 8 through 11.

At 1735 the UE 115 may monitor for the paging message according to a PO periodicity and the received WUS. For example, the UE 115 may tune a receiver to monitor for an anticipated paging message based on the PO periodicity and the received WUS. The operations of 1735 may be performed according to the methods described herein. In certain examples, aspects of the operations of 1735 may be performed by a UE page monitoring component as described with reference to FIGS. 8 through 11.

Figure 18:
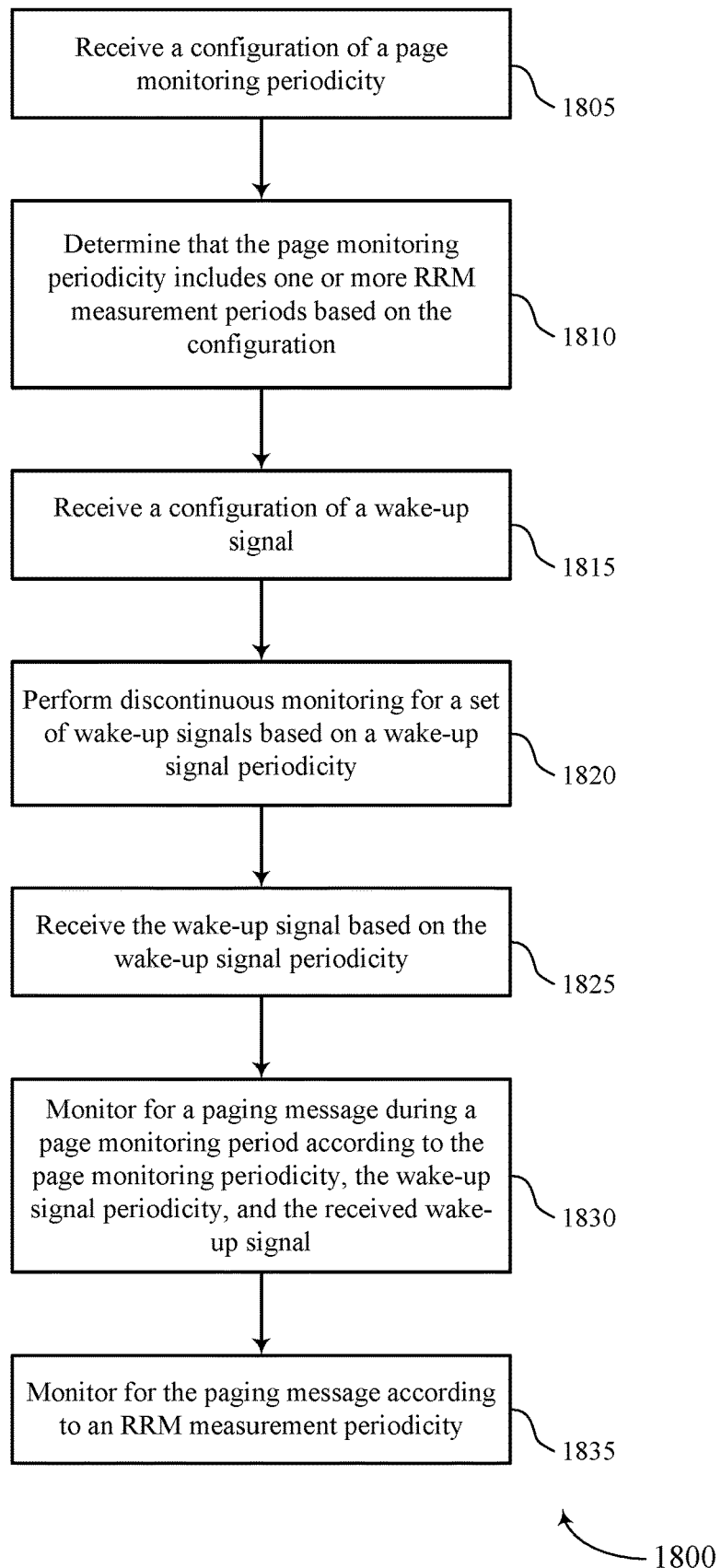

FIG. 18 shows a flowchart illustrating a method 1800 for fallback mode for WUS receivers in accordance with aspects of the present disclosure. The operations of method 1800 may be implemented by a UE 115 or its components as described herein. For example, the operations of method 1800 may be performed by a UE communications manager as described with reference to FIGS. 8 through 11. In some examples, a UE 115 may execute a set of codes to control the functional elements of the device to perform the functions described herein. Additionally or alternatively, the UE 115 may perform aspects of the functions described herein using special-purpose hardware.

At 1805 the UE 115 may receive a configuration of a page monitoring periodicity. The operations of 1805 may be performed according to the methods described herein. In certain examples, aspects of the operations of 1805 may be performed by a UE page monitoring component as described with reference to FIGS. 8 through 11.

At 1810 the UE 115 may determine that the page monitoring periodicity comprises one or more RRM measurement periods based at least in part on the configuration. For example, the UE 115 may identify the decoded one or more bits corresponding to the configuration, and may determine the page monitoring periodicity from the decoded one or more bits. The operations of 1810 may be performed according to the methods described herein. In certain examples, aspects of the operations of 1810 may be performed by a RRM measurement component as described with reference to FIGS. 8 through 11.

At 1815 the UE 115 may receive a configuration of a WUS. The operations of 1815 may be performed according to the methods described herein. In certain examples, aspects of the operations of 1815 may be performed by a UE wake-up signal component as described with reference to FIGS. 8 through 11.

At 1820 the UE 115 may perform discontinuous monitoring for a plurality of WUSs based at least in part on a WUS periodicity. The operations of 1820 may be performed according to the methods described herein. In certain examples, aspects of the operations of 1820 may be performed by a UE wake-up signal component as described with reference to FIGS. 8 through 11.

At 1825 the UE 115 may receive the WUS based at least in part on the WUS periodicity. The operations of 1825 may be performed according to the methods described herein. In certain examples, aspects of the operations of 1825 may be performed by a receiver as described with reference to FIGS. 8 through 11.

At 1830 the UE 115 may monitor for a paging message during a page monitoring period according to the page monitoring periodicity, the WUS periodicity, and the received WUS. The operations of 1830 may be performed according to the methods described herein. In certain examples, aspects of the operations of 1830 may be performed by a UE page monitoring component as described with reference to FIGS. 8 through 11.

At 1835 the UE 115 may monitor for the paging message according to an RRM measurement periodicity. For example, the UE 115 may tune a receiver to monitor for an anticipated paging message based on the RRM measurement periodicity and the received WUS. The operations of 1835 may be performed according to the methods described herein. In certain examples, aspects of the operations of 1835 may be performed by a UE page monitoring component as described with reference to FIGS. 8 through 11.

Figure 19:
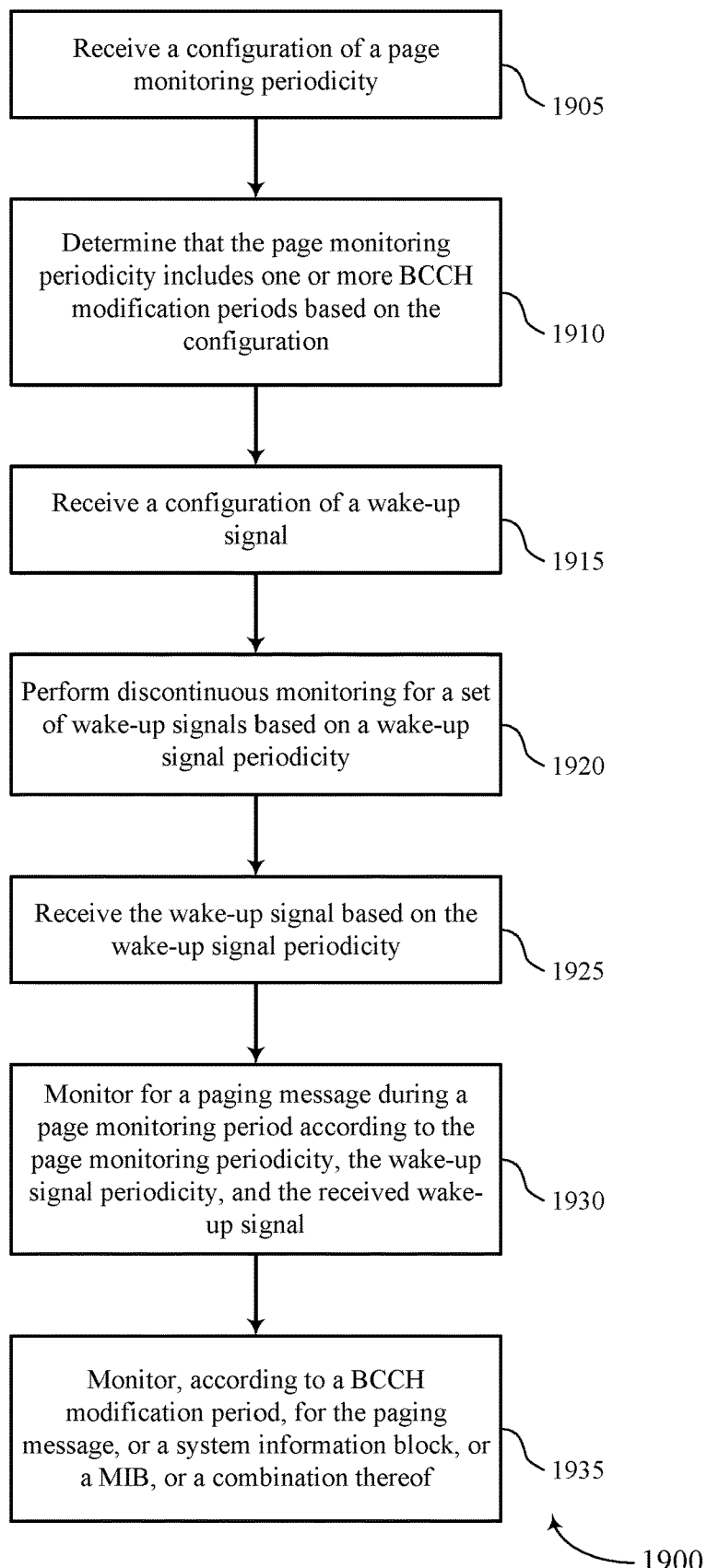

FIG. 19 shows a flowchart illustrating a method 1900 for fallback mode for WUS receivers in accordance with aspects of the present disclosure. The operations of method 1900 may be implemented by a UE 115 or its components as described herein. For example, the operations of method 1900 may be performed by a UE communications manager as described with reference to FIGS. 8 through 11. In some examples, a UE 115 may execute a set of codes to control the functional elements of the device to perform the functions described herein. Additionally or alternatively, the UE 115 may perform aspects of the functions described herein using special-purpose hardware.

At 1905 the UE 115 may receive a configuration of a page monitoring periodicity. The operations of 1905 may be performed according to the methods described herein. In certain examples, aspects of the operations of 1905 may be performed by a UE page monitoring component as described with reference to FIGS. 8 through 11.

At 1910 the UE 115 may determine that the page monitoring periodicity comprises one or more BCCH modification periods based at least in part on the configuration. For example, the UE 115 may identify the decoded one or more bits corresponding to the configuration, and may determine the page monitoring periodicity from the decoded one or more bits. The operations of 1910 may be performed according to the methods described herein. In certain examples, aspects of the operations of 1910 may be performed by a UE broadcast channel component as described with reference to FIGS. 8 through 11.

At 1915 the UE 115 may receive a configuration of a WUS. The operations of 1915 may be performed according to the methods described herein. In certain examples, aspects of the operations of 1915 may be performed by a UE wake-up signal component as described with reference to FIGS. 8 through 11.

At 1920 the UE 115 may perform discontinuous monitoring for a plurality of WUSs based at least in part on a WUS periodicity. The operations of 1920 may be performed according to the methods described herein. In certain examples, aspects of the operations of 1920 may be performed by a UE wake-up signal component as described with reference to FIGS. 8 through 11.

At 1925 the UE 115 may receive the WUS based at least in part on the WUS periodicity. The operations of 1925 may be performed according to the methods described herein. In certain examples, aspects of the operations of 1925 may be performed by a receiver as described with reference to FIGS. 8 through 11.

At 1930 the UE 115 may monitor for a paging message during a page monitoring period according to the page monitoring periodicity, the WUS periodicity, and the received WUS. The operations of 1930 may be performed according to the methods described herein. In certain examples, aspects of the operations of 1930 may be performed by a UE page monitoring component as described with reference to FIGS. 8 through 11.

At 1935 the UE 115 may monitor, according to a BCCH modification period, for the paging message, or a system information block, or an MIB, or a combination thereof. For example, the UE 115 may tune a receiver to monitor for an anticipated paging message based on the BCCH modification period. The operations of 1935 may be performed according to the methods described herein. In certain examples, aspects of the operations of 1935 may be performed by a UE page monitoring component as described with reference to FIGS. 8 through 11.

Figure 20:
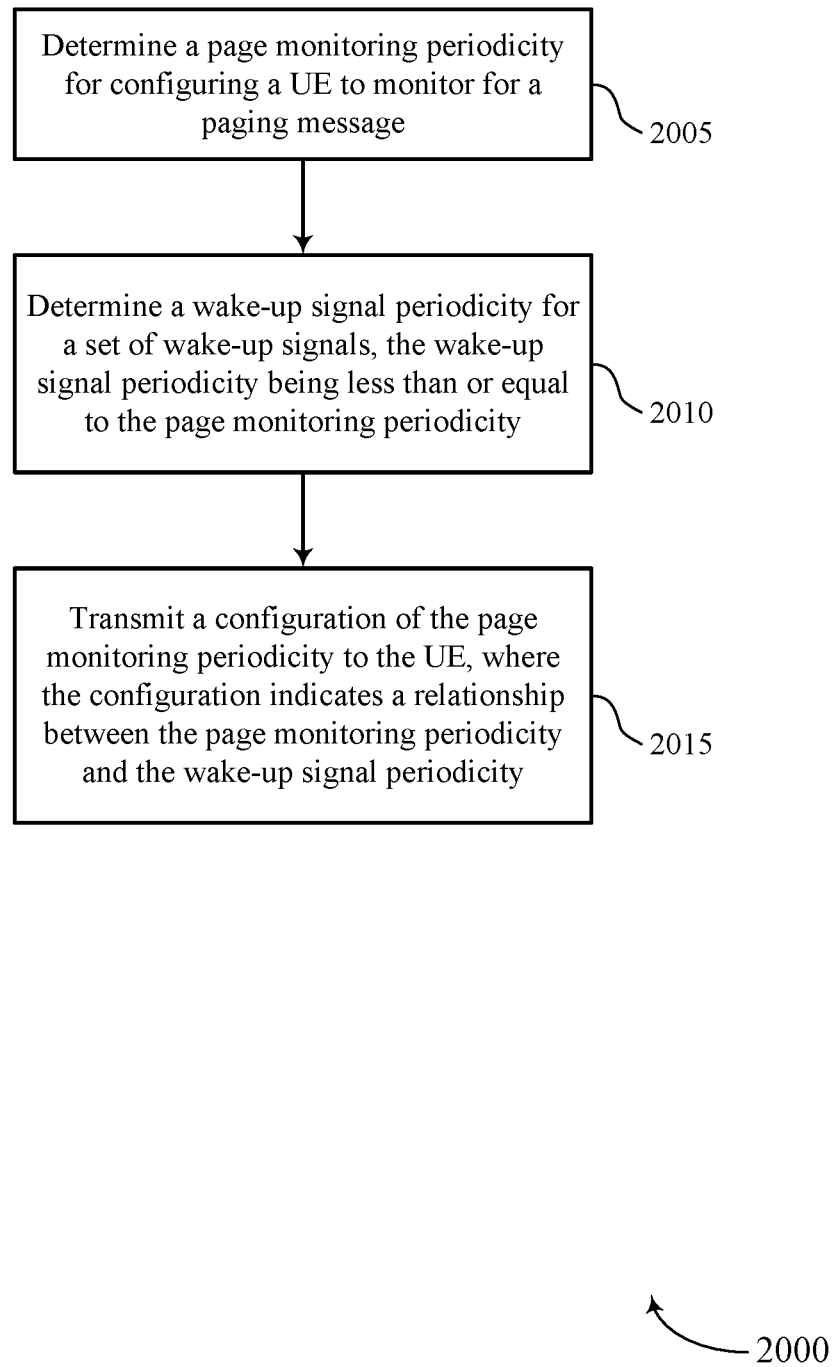

FIG. 20 shows a flowchart illustrating a method 2000 for fallback mode for WUS receivers in accordance with aspects of the present disclosure. The operations of method 2000 may be implemented by a base station 105 or its components as described herein. For example, the operations of method 2000 may be performed by a base station communications manager as described with reference to FIGS. 12 through 15. In some examples, a base station 105 may execute a set of codes to control the functional elements of the device to perform the functions described herein. Additionally or alternatively, the base station 105 may perform aspects of the functions described herein using special-purpose hardware.

At 2005, the base station 105 may determine a page monitoring periodicity for configuring a UE 115 to monitor for a paging message. In some cases, the determination for page monitoring periodicity may be based in part on UE capabilities, power considerations, radio technologies deployed at the UE 115, or any other parameters, received from the UE 115 or determined by the network. The operations of 2005 may be performed according to the methods described herein. In certain examples, aspects of the operations of 2005 may be performed by a base station page monitoring component as described with reference to FIGS. 12 through 15.

At 2010, the base station 105 may determine a WUS periodicity for a plurality of WUSs, the WUS periodicity being less than or equal to the page monitoring periodicity. The operations of 2010 may be performed according to the methods described herein. In certain examples, aspects of the operations of 2010 may be performed by a base station wake-up signal component as described with reference to FIGS. 12 through 15.

At 2015, the base station 105 may transmit a configuration of the page monitoring periodicity to the UE, wherein the configuration indicates a relationship between the page monitoring periodicity and the WUS periodicity. In some cases, the relationship between the page monitoring periodicity and the WUS periodicity may be dependent on the one or more parameters described at 1705. The operations of 2015 may be performed according to the methods described herein. In certain examples, aspects of the operations of 2015 may be performed by a transmitter as described with reference to FIGS. 12 through 15. In some cases, the configuration of the page monitoring periodicity may be received at the transmitter from the base station page monitoring component. In some cases, transmitting the configuration of the page monitoring periodicity to the UE 115 may include identifying time and frequency resources over which the configuration is transmitted, obtaining bits for the transmission from the base station page monitoring component, and encoding them prior to transmission. In some cases, the encoding may be performed based on a modulation and coding scheme determined by the base station 105.

Figure 21:
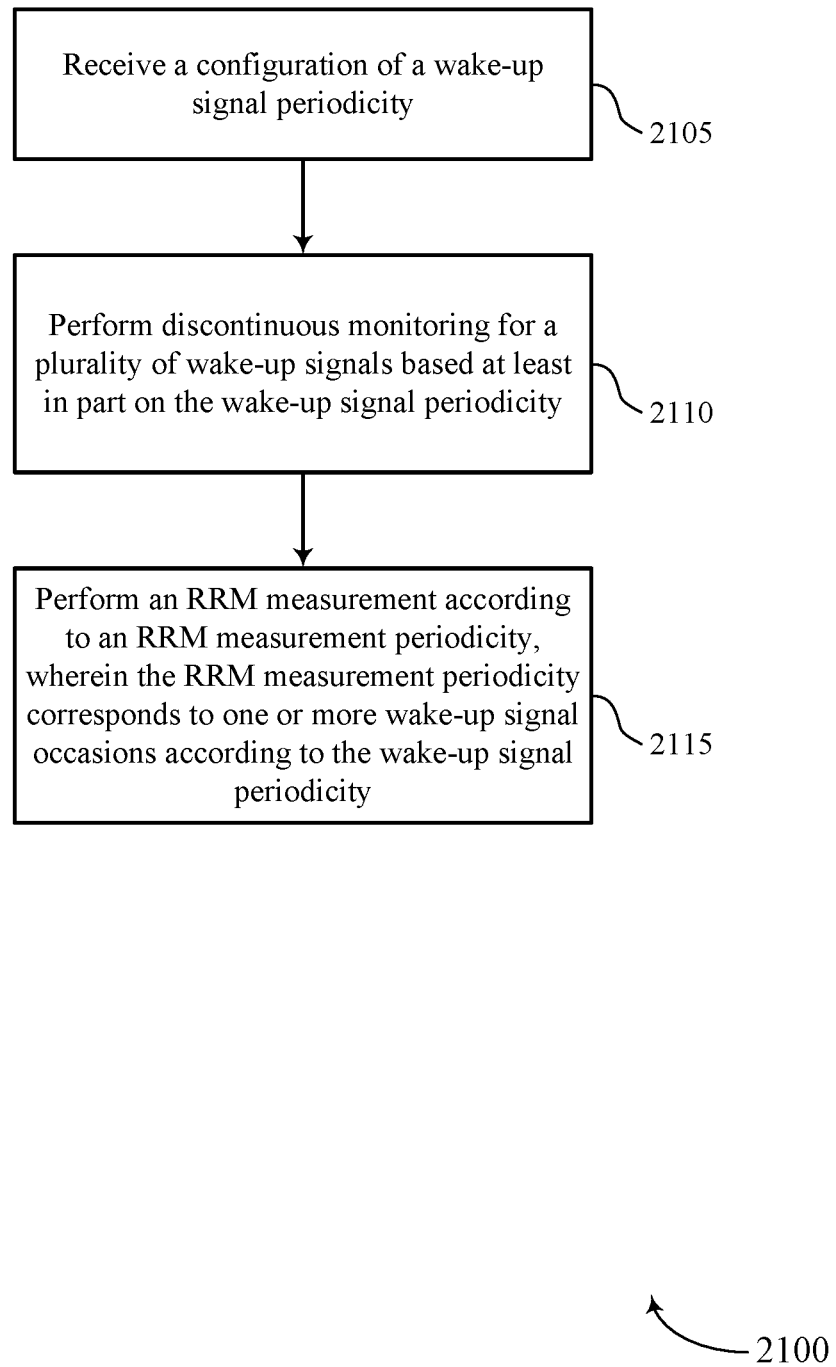

FIG. 21 shows a flowchart illustrating a method 2100 for fallback mode for WUS receivers in accordance with aspects of the present disclosure. The operations of method 2100 may be implemented by a UE 115 or its components as described herein. For example, the operations of method 2100 may be performed by a UE communications manager as described with reference to FIGS. 8 through 11. In some examples, a UE 115 may execute a set of codes to control the functional elements of the device to perform the functions described herein. Additionally or alternatively, the UE 115 may perform aspects of the functions described herein using special-purpose hardware.

At 2105 the UE 115 may receive a configuration of a wake-up signal periodicity. The operations of 2105 may be performed according to the methods described herein. In certain examples, aspects of the operations of 2105 may be performed by a UE wake-up signal component as described with reference to FIGS. 8 through 11. In some cases, receiving the configuration of the wake-up signal periodicity may include identifying time and frequency resources over which the configuration is received, demodulating the transmission over the identified time-frequency resources, and decoding the demodulated transmission using a decoder, to obtain one or more bits pertaining to the configuration.

At 2110 the UE 115 may perform discontinuous monitoring for a plurality of WUSs based at least in part on a WUS periodicity. For example, the WUS periodicity may be determined based on the WUS configuration received at 2105. In some cases, the UE 115 may perform a decoding procedure to determine the WUS periodicity, and may control one or more functional elements (e.g., receiver, or wake-up signal component) to monitor the WUSs. The operations of 2110 may be performed according to the methods described herein. In certain examples, aspects of the operations of 2110 may be performed by a UE wake-up signal component as described with reference to FIGS. 8 through 11.

At 2115 the UE 115 may perform an RRM measurement according to an RRM measurement periodicity, wherein the RRM measurement periodicity corresponds to one or more wake-up signal occasions according to the wake-up signal periodicity. In some cases, the RRM measurement periodicity may be configured by a base station 105. In some examples, the RRM measurement periodicity may be determined based on RRM measurements. The operations of 2115 may be performed according to the methods described herein. In certain examples, aspects of the operations of 2115 may be performed by an RRM measurement component as described with reference to FIGS. 8 through 11.

Figure 22:
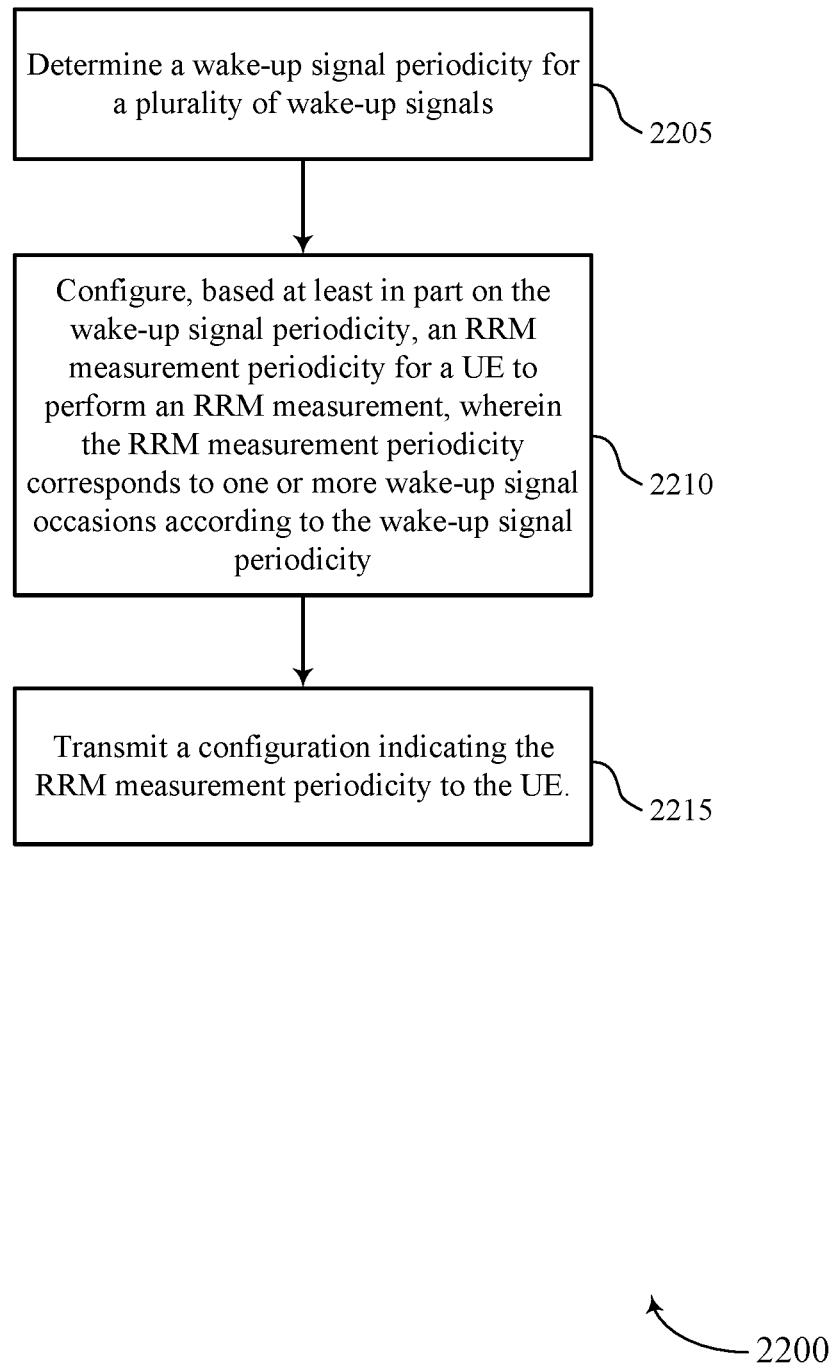

FIG. 22 shows a flowchart illustrating a method 2200 for fallback mode for WUS receivers in accordance with aspects of the present disclosure. The operations of method 2200 may be implemented by a base station 105 or its components as described herein. For example, the operations of method 2200 may be performed by a base station communications manager as described with reference to FIGS. 12 through 15. In some examples, a base station 105 may execute a set of codes to control the functional elements of the device to perform the functions described herein. Additionally or alternatively, the base station 105 may perform aspects of the functions described herein using special-purpose hardware.

At 2205, the base station 105 may determine a wake-up signal periodicity for a plurality of wake-up signals. The operations of 2205 may be performed according to the methods described herein. In certain examples, aspects of the operations of 2205 may be performed by a base station page monitoring component as described with reference to FIGS. 12 through 15.

At 2210, the base station 105 may configure, based at least in part on the wake-up signal periodicity, an RRM measurement periodicity for a UE 115 to perform an RRM measurement, wherein the RRM measurement periodicity corresponds to one or more wake-up signal occasions according to the wake-up signal periodicity. In some cases, the base station 105 may configure the RRM measurement periodicity based on RRM measurements received from the UE 115 (e.g., at an earlier time). The operations of 2210 may be performed according to the methods described herein. In certain examples, aspects of the operations of 2210 may be performed by an RRM component as described with reference to FIGS. 12 through 15.

At 2215, the base station 105 may transmit a configuration indicating the RRM measurement periodicity to the UE 115. The operations of 2015 may be performed according to the methods described herein. In certain examples, aspects of the operations of 2215 may be performed by a transmitter as described with reference to FIGS. 12 through 15. In some cases, the configuration may be received at the transmitter from the RRM component. In some cases, transmitting the configuration to the UE 115 may include identifying time and frequency resources over which the configuration is transmitted, obtaining bits for the transmission from the base station page monitoring component, and encoding them prior to transmission. In some cases, the encoding may be performed based on a modulation and coding scheme determined by the base station 105.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   receiving a configuration of a wake-up signal periodicity;
   performing discontinuous monitoring for a plurality of wake-up signals based at least in part on the wake-up signal periodicity; and
   performing a radio resource management (RRM) measurement according to an RRM measurement periodicity, wherein the RRM measurement periodicity corresponds to one or more wake-up signal occasions according to the wake-up signal periodicity.

2. The method of claim 1, further comprising:
   determining, based on the RRM measurement, a reference signal received power (RSRP), or a reference signal received quality (RSRQ), or a confirmation of a serving cell, or a combination thereof.

3. The method of claim 1, wherein the wake-up signal periodicity corresponds to one or more discontinuous reception (DRX) cycles.

4. The method of claim 1, further comprising:
   determining whether a wake-up signal is detected at the one or more wake-up signal occasions; and
   performing the RRM measurement based on a determination that at least one wake-up signal is detected at the one or more wake-up signal occasions.

5. The method of claim 1, further comprising:
   determining whether a wake-up signal is detected at the one or more wake-up signal occasions; and
   performing the RRM measurement at a temporally last wake-up signal occasion based on a determination that no wake-up signals were detected at the one or more wake-up signal occasions.

6. The method of claim 1, further comprising:
   detecting a paging message according to a page monitoring periodicity that corresponds to the RRM measurement periodicity; and
   identifying a system information change notification based at least in part on the detected paging message.

7. A method for wireless communication at a base station, comprising:
   determining a wake-up signal periodicity for a plurality of wake-up signals;
   configuring, based at least in part on the wake-up signal periodicity, a radio resource management (RRM) measurement periodicity for a user equipment (UE) to perform an RRM measurement, wherein the RRM measurement periodicity corresponds to one or more wake-up signal occasions according to the wake-up signal periodicity; and transmitting a configuration indicating the RRM measurement periodicity to the UE.

8. The method of claim 7, further comprising:
configuring the RRM measurement periodicity based at least in part on one or more RRM measurements performed by the UE.

9. The method of claim 7, wherein the wake-up signal periodicity corresponds to one or more discontinuous reception (DRX) cycles.

10. The method of claim 7, further comprising:
transmitting, within the configuration, an indication that a page monitoring periodicity comprises one or more radio resource management (RRM) measurement periods.

11. The method of claim 7, further comprising:
transmitting a system information change notification within a paging message, wherein the paging message is transmitted according to the RRM measurement periodicity.

12. An apparatus for wireless communication at a user equipment (UE), comprising:
a receiver configured to receive a configuration of a wake-up signal periodicity;
a processor;
memory in electronic communication with the processor; and
instructions stored in the memory and executable by the processor to cause the apparatus to:
perform discontinuous monitoring for a plurality of wake-up signals based at least in part on the wake-up signal periodicity; and
perform a radio resource management (RRM) measurement according to an RRM measurement periodicity, wherein the RRM measurement periodicity corresponds to one or more wake-up signal occasions according to the wake-up signal periodicity.

13. The apparatus of claim 12, wherein the instructions are further executable by the processor to cause the apparatus to:
determine, based on the RRM measurement, a reference signal received power (RSRP), or a reference signal received quality (RSRQ), or a confirmation of a serving cell, or a combination thereof.

14. The apparatus of claim 12, wherein the wake-up signal periodicity corresponds to one or more discontinuous reception (DRX) cycles.

15. The apparatus of claim 12, wherein the instructions are further executable by the processor to cause the apparatus to:
determine whether a wake-up signal is detected at the one or more wake-up signal occasions; and
perform the RRM measurement based on a determination that at least one wake-up signal is detected at the one or more wake-up signal occasions.

16. The apparatus of claim 12, wherein the instructions are further executable by the processor to cause the apparatus to:
determine whether a wake-up signal is detected at the one or more wake-up signal occasions; and
perform the RRM measurement at a temporally last wake-up signal occasion based on a determination that no wake-up signals were detected at the one or more wake-up signal occasions.

17. The apparatus of claim 12, wherein the instructions are further executable by the processor to cause the apparatus to:
detect a paging message according to a page monitoring periodicity that corresponds to the RRM measurement periodicity; and
identify a system information change notification based at least in part on the detected paging message.

18. An apparatus for wireless communication at a base station, comprising:
a processor;
memory in electronic communication with the processor;
instructions stored in the memory and executable by the processor to cause the apparatus to:
determine a wake-up signal periodicity for a plurality of wake-up signals; and
configure, based at least in part on the wake-up signal periodicity, a radio resource management (RRM) measurement periodicity for a user equipment (UE) to perform an RRM measurement, wherein the RRM measurement periodicity corresponds to one or more wake-up signal occasions according to the wake-up signal periodicity; and
a transmitter configured to transmit a configuration indicating the RRM measurement periodicity to the UE.

19. The apparatus of claim 18, wherein the instructions are further executable by the processor to cause the apparatus to:
configure the RRM measurement periodicity based at least in part on one or more RRM measurements performed by the UE.

20. The apparatus of claim 18, wherein the wake-up signal periodicity corresponds to one or more discontinuous reception (DRX) cycles.

21. The apparatus of claim 18, wherein the instructions are further executable by the processor to cause the apparatus to:
transmit, within the configuration, an indication that a page monitoring periodicity comprises one or more radio resource management (RRM) measurement periods.

22. The apparatus of claim 18, wherein the instructions are further executable by the processor to cause the apparatus to:
transmit a system information change notification within a paging message, wherein the paging message is transmitted according to the RRM measurement periodicity.

23. An apparatus for wireless communication at a user equipment (UE), comprising:
means for receiving a configuration of a wake-up signal periodicity;
means for performing discontinuous monitoring for a plurality of wake-up signals based at least in part on the wake-up signal periodicity; and
means for performing a radio resource management (RRM) measurement according to an RRM measurement periodicity, wherein the RRM measurement periodicity corresponds to one or more wake-up signal occasions according to the wake-up signal periodicity.

24. An apparatus for wireless communication at a base station, comprising:

means for determining a wake-up signal periodicity for a plurality of wake-up signals;
means for configuring, based at least in part on the wake-up signal periodicity, a radio resource management (RRM) measurement periodicity for a user equipment (UE) to perform an RRM measurement, wherein the RRM measurement periodicity corresponds to one or more wake-up signal occasions according to the wake-up signal periodicity; and
means for transmitting a configuration indicating the RRM measurement periodicity to the UE.

25. A non-transitory computer-readable medium storing code for wireless communication at a user equipment (UE), the code comprising instructions executable by a processor to:
receive a configuration of a wake-up signal periodicity;
perform discontinuous monitoring for a plurality of wake-up signals based at least in part on the wake-up signal periodicity; and
perform a radio resource management (RRM) measurement according to an RRM measurement periodicity, wherein the RRM measurement periodicity corresponds to one or more wake-up signal occasions according to the wake-up signal periodicity.

26. A non-transitory computer-readable medium storing code for wireless communication at a base station, the code comprising instructions executable by a processor to:
determine a wake-up signal periodicity for a plurality of wake-up signals;
configure, based at least in part on the wake-up signal periodicity, a radio resource management (RRM) measurement periodicity for a user equipment (UE) to perform an RRM measurement, wherein the RRM measurement periodicity corresponds to one or more wake-up signal occasions according to the wake-up signal periodicity; and
transmit a configuration indicating the RRM measurement periodicity to the UE.

* * * * *